United States Patent
Lécart et al.

(10) Patent No.: US 10,990,830 B2
(45) Date of Patent: Apr. 27, 2021

(54) AUTO-CALIBRATION OF TRACKING SYSTEMS

(71) Applicant: Genetec Inc., St-Laurent (CA)

(72) Inventors: Myriam Lécart, Verdun (CA); Jonathan Lavoie, Montreal (CA)

(73) Assignee: GENETEC INC., St-Laurent (CA)

( * ) Notice: Subject to any disclaimer, the term of this patent is extended or adjusted under 35 U.S.C. 154(b) by 31 days.

(21) Appl. No.: 16/330,511

(22) PCT Filed: Sep. 12, 2017

(86) PCT No.: PCT/CA2017/051069
§ 371 (c)(1),
(2) Date: Mar. 5, 2019

(87) PCT Pub. No.: WO2018/049514
PCT Pub. Date: Mar. 22, 2018

(65) Prior Publication Data
US 2019/0228232 A1      Jul. 25, 2019

Related U.S. Application Data

(60) Provisional application No. 62/393,797, filed on Sep. 13, 2016.

(51) Int. Cl.
*G06K 9/00* (2006.01)
*G08G 1/017* (2006.01)
(Continued)

(52) U.S. Cl.
CPC ............ *G06K 9/00771* (2013.01); *G06T 7/80* (2017.01); *G07B 15/00* (2013.01); *G08G 1/0129* (2013.01);
(Continued)

(58) Field of Classification Search
None
See application file for complete search history.

(56) References Cited

U.S. PATENT DOCUMENTS 6,587,586 B1    7/2003  Cui et al.
6,754,369 B1    6/2004  Sazawa
(Continued)

FOREIGN PATENT DOCUMENTS

KR    10-2013-0081958 A    7/2013
WO    2014/072971 A1       5/2014
(Continued)

OTHER PUBLICATIONS

International application No. PCT/CA2017/051069 International Preliminary Report on Patentability dated Mar. 19, 2019.
(Continued)

*Primary Examiner* — Leon Flores
(74) *Attorney, Agent, or Firm* — Anglehart et al.

(57) ABSTRACT

An automatically calibrated vehicle-tracking system and methods of use thereof. The automatically calibrated vehicle-tracking system has an input interface for receiving an image stream from a tracking camera and vehicle license plate data indicative of valid license plate detections from a license plate camera; a general purpose processor; a computer-readable memory comprising calibration program code for calibrating the vehicle-tracking system, the calibration program code comprising: a tracking module to generate a plurality of calibration tracks, a pairing module to identify, for each of the plurality of calibration tracks, an association between a valid license plate detection and the calibration track and a calibration to set a threshold for a track parameter.

28 Claims, 11 Drawing Sheets

Vehicle Tracking Architecture 100

(51) Int. Cl.
*G08G 1/04* (2006.01)
*G06T 7/80* (2017.01)
*G07B 15/00* (2011.01)
*G08G 1/01* (2006.01)
*G07B 15/06* (2011.01)

(52) U.S. Cl.
CPC ............. *G08G 1/0175* (2013.01); *G08G 1/04* (2013.01); *G06K 2209/15* (2013.01); *G06T 2207/10016* (2013.01); *G06T 2207/30241* (2013.01); *G06T 2207/30252* (2013.01); *G07B 15/06* (2013.01)

(56) References Cited

U.S. PATENT DOCUMENTS

| | | | |
|---|---|---|---|
| 6,754,663 | B1 | 6/2004 | Small et al. |
| 7,446,817 | B2 | 11/2008 | Jung et al. |
| 7,504,965 | B1 | 3/2009 | Windover et al. |
| 7,982,634 | B2 | 7/2011 | Arrighetti |
| 8,229,168 | B2 | 7/2012 | Geva et al. |
| 8,243,140 | B1 | 8/2012 | Howe |
| 8,290,213 | B2 | 10/2012 | Chen et al. |
| 8,331,621 | B1 | 12/2012 | Allen et al. |
| 8,437,553 | B2 | 5/2013 | Washida |
| 8,682,036 | B2 | 3/2014 | Wang et al. |
| 8,731,244 | B2 | 5/2014 | Wu |
| 8,750,564 | B2 | 6/2014 | Maeda et al. |
| 8,781,172 | B2 | 7/2014 | Kozitsky et al. |
| 8,879,796 | B2 | 11/2014 | Rodriguez Serrano |
| 9,042,647 | B2 | 5/2015 | Kozitsky et al. |
| 9,064,174 | B2 | 6/2015 | Nister et al. |
| 9,349,066 | B2 | 5/2016 | Koo et al. |
| 9,367,769 | B2 | 6/2016 | Liu |
| 9,396,403 | B2 | 7/2016 | Karkowski et al. |
| 9,449,258 | B1 * | 9/2016 | Palacio .................. H04N 5/247 |
| 9,953,245 | B2 * | 4/2018 | Palacio .................. H04N 7/181 |
| 2009/0079960 | A1 | 3/2009 | Chung |
| 2009/0202105 | A1 | 8/2009 | Castro Abrantes et al. |
| 2009/0208060 | A1 | 8/2009 | Wang et al. |
| 2012/0063737 | A1 | 3/2012 | Gregoire |
| 2013/0307979 | A1 | 11/2013 | Chen et al. |
| 2014/0022406 | A1 | 1/2014 | Baheti et al. |
| 2014/0355836 | A1 | 12/2014 | Kozitsky et al. |
| 2015/0154463 | A1 | 6/2015 | Besiris et al. |
| 2015/0235092 | A1 | 8/2015 | Mei et al. |
| 2016/0004922 | A1 | 1/2016 | Hashiya |
| 2016/0063341 | A1 | 3/2016 | Ogata et al. |
| 2016/0155020 | A1 | 6/2016 | Tariq et al. |
| 2016/0162733 | A1 | 6/2016 | Rouh et al. |
| 2016/0171312 | A1 | 6/2016 | Aok et al. |
| 2016/0171328 | A1 | 6/2016 | Bulan et al. |
| 2016/0171329 | A1 | 6/2016 | Khintsitskiy et al. |

FOREIGN PATENT DOCUMENTS

| | | |
|---|---|---|
| WO | 2015/165524 A1 | 11/2015 |
| WO | 2016/060542 A1 | 4/2016 |
| WO | 2016/089918 A1 | 6/2016 |

OTHER PUBLICATIONS

PCT/CA2017/051069 International Search Report.
PCT/CA2017/051069 Search Strategy.
PCT/CA2017/051069 Written Opinion.

* cited by examiner

Track Object
1000

> The estimated median image of the track object;
>
> The history of the blob object size;
>
> The state of the track;
>
> The time stamp of the image frame in which the blob object of the track object appeared for the first time;
>
> The last image in which the blob object of the track was identified;
>
> The last blob object ID associated with the track;
>
> The number of image frames composing the track object;
>
> The number of consecutive image frames in which the track is missing;
>
> The number of times the pattern matching was sucessful between blob objects;
>
> The trajectory of the track between image frames;
>
> The patches of the last blob object the track is associated with;
>
> A flag that is set to true if the track is associated with a license plate detection event;
>
> A list of tracks have merged with this track.

FIG. 10

AUTO-CALIBRATION OF TRACKING SYSTEMS

CROSS-REFERENCE TO RELATED APPLICATIONS

This application claims priority of U.S. provisional patent application 62/393,797 filed on Sep. 13, 2016.

TECHNICAL FIELD

The present application relates to the field of vehicle tracking and license plate detection systems.

BACKGROUND

Automatic license plate reading (ALPR) is at the core of several parking enforcement and traffic management applications. Although after years of development ALPR technologies have become quite advanced, license plate recognition is not helpful in situations where the license plate cannot be seen or detected. A license plate can be missed for various reasons, such as if the license plate is partially hidden (e.g. by a bicycle rack), the license plate does not have a reflective surface, the license plate is masked by dirt or snow, etc. The inability to read a license plate in such circumstances may be problematic for certain applications, and prevents ALPR from being relied upon in certain applications where it could be useful. In particular, ALPR cannot be solely relied upon as vehicle detection mechanisms except for controlled environments where adequate visibility of license plates is guaranteed. For example, in an installation where the successful license plate read triggers the activation of a gate, upon the occurrence of a missed license plate (e.g. because the plate is dirty or otherwise invisible to the system), the gate would not open. The driver would then have to call an operator that will then manually activate the gate after verifying the vehicle's license plate, resulting in loss of time and resources.

In certain applications, the ALPR unit can be coupled to an external trigger. The system can be configured to capture a plate image and try to read it every time a signal has been received from an external device.

This external trigger can be electric. For example, a vehicle ground loop detection circuit can be installed in the pavement. When a vehicle passes over the loop, eddy currents are induced in the wire loops, reducing the inductance, which is interpreted in an electronic device that sends a signal. However, this installation is not simple since it requires the expensive installation and maintenance. Another popular and efficient external device is the LIDAR ("Light Detection and Ranging"). The LIDAR is a surveying device that illuminates a target with a laser light and measures the distance that the light has travelled. This device can be calibrated to detect cars. However, the installation of these solutions is costly and may be prone to false positives.

Therefore, a solution for effectively detecting missed license plate reads that can be easily calibrated is sought.

SUMMARY

The external trigger system, in addition to ALPR, may be software-based. For instance, different video analytics can be used as a trigger, such as motion detection, crosswire, etc. The choice of video analytics used may depend upon the camera configuration. However, the performance of the selected video analytics is also usually very sensitive, reacting to, for example, the lighting, the image quality, camera vibrations. Therefore, the calibration, and the installation of the camera, may be complex as a result of this added sensitivity. Moreover, the performance of the ALPR system and the video analytics may be dramatically impacted if the calibration is not optimal.

In accordance with a first broad aspect a method may be provided for automatically calibrating a vehicle tracking system. The vehicle tracking system is configured for operation with at least a two camera system for receiving at least a context image stream from a tracking camera and vehicle license plate data indicative of valid license plate detections from a license plate camera. The method involves generating a plurality of calibration tracks each defining the movement of a respective object over the course of several respective context images in the context image stream received from the tracking camera by, for each calibration track, identifying the respective object in at least a subset of the several respective context images and calculating a trajectory across these images.

The methods may also include, for each of the plurality of calibration tracks, identifying an association between a valid license plate detection and the calibration track by computing a spatio-temporal overlap between a license plate detected in the valid license plate detection and the calibration track. The method entails computing a heuristic extremum value for a track parameter across all the plurality of calibration tracks and setting a threshold for the track parameter as a function of the extremum value computed, the threshold being determinative of a track corresponding to a vehicle. The threshold is used for tracking vehicles by subsequently comparing subsequent tracks having no associated valid license plate detection against the threshold and determining that they correspond to respective vehicles on the basis of their meeting the threshold.

The computing of a spatio-temporal overlap between a license plate detected in the valid license plate detection and the calibration track may involve performing a geometric transformation to derive an image space location in the context image stream of the detected license plate and comparing the image space location of the detected license plate in the context image stream with an image space location of the calibration track.

The comparing of the image space location of the detected license plate in the context image stream with an image space location of the calibration track may include comparing the image space location of the detected license plate in the context image stream with an image space location of the respective object in at least one context image in the at least a subset of the several respective context images. In particular, the license plate detection may be derived from an image region in a first image from one of the two cameras and the calibration track may be associated with a region in an image from the other one of the two cameras (e.g. a region wherein motion has been detected) and the spatio-temporal overlap may be calculation may be a calculation to determine that the region for the license plate corresponds spatially to the region in the other image for the detected motion. Temporal overlap may be based on the images being taken at, or nearly at, the same time.

The computing of a spatio-temporal overlap between a license plate detected in the valid license plate detection and the calibration track may include comparing a detection timestamp associated with the valid license plate detection and a time parameter for the calibration track. The identifying of the respective object in at least a subset of the several respective images may be performed by computing a running Gaussian average and performing a connected component analysis.

In some embodiments, the respective object may be characterized in an image as a body of pixels within a boundary, and the calculating the trajectory of the respective object may include computing pixel intersections between bodies of pixels identified in consecutive images of the subset of the several respective context images.

In some embodiments, the track parameter is one of a set of track parameters, and wherein the computing a heuristic extremum value for a track parameter may involve computing a heuristic extremum value for each track parameter of the set of track parameters across all the plurality of calibration tracks. The setting a threshold for the track parameter as a function of the extremum value computed may include setting for each track parameter of the set of track parameters a threshold for each track parameter as a function of the extremum value computed to generate a set of thresholds. The comparing subsequent tracks having no associated valid license plate read to the threshold and determining that they correspond to a vehicle on the basis of their meeting the threshold may entail subsequently comparing subsequent tracks having no associated valid license plate read against each threshold of the set of thresholds and determining that they correspond to a respective vehicle on the basis of their meeting each of the thresholds of the set of thresholds.

The set of threshold may include a minimum size of the respective object, a maximum size of the respective object, a minimum appear count of the respective object in the track, a maximum appear count of the respective object in the track, a minimum trajectory distance of the respective object, and/or a maximum trajectory distance of the respective object. The set of threshold parameters may include a minimum size of the respective object, a minimum appear count of the respective object in the track, and a minimum trajectory distance of the respective object.

In some embodiments, the method may include discarding calibration tracks that fail to meet at least one calibration false-positive threshold corresponding to a given track parameter prior to the step of computing the heuristic extremum value for the track parameter. The calibration false-positive threshold may include a maximum size of the respective object of the calibration track, a maximum appear count of the respective object whose movement is defined by the calibration track, and/or a maximum trajectory distance of the respective object whose movement is defined by the calibration track.

In some embodiments, for each of the plurality of calibration track, the method may also include comparing the calibration track to a track criterion and discarding the calibration track prior to computing the heuristic extremum value for the track parameter if the track criterion is not met.

In some embodiments, the method may further involve detecting a merger between two calibration tracks and discarding each of the two calibration tracks prior to computing the heuristic extremum value for the track parameter. In some embodiments, the method may include detecting a split in a particular calibration track and discarding the particular calibration prior to computing the heuristic extremum value for the track parameter. In some embodiments, the method may involve discarding calibration tracks that have not been successfully associated with a valid license plate detection. In some embodiments, the method may entail accumulating a preset number of calibration tracks that have not been discarded prior to computing the heuristic extremum value for the track parameter.

In accordance with a second broad aspect is provided a method for automatically calibrating an object tracking system. This method may employ similar methodology to the above examples, however may be track object other than vehicles based on detection of characteristics other than license plates. For example, the object tracking system being configured for receiving at least one image stream from a camera and for detecting an identifiable object characteristic in the at least one image stream. The method includes generating a plurality of calibration tracks each defining the movement of a respective object over the course of several respective images in the image stream received from the tracking camera by, for each calibration track, identifying the respective object in at least a subset of the several respective images and calculating a trajectory across these images. The method entails computing a plurality of valid detections of the identifiable object characteristic in the at least one image stream. The method also entails, for each of the plurality of calibration tracks, computing a spatio-temporal overlap between the identifiable object characteristic of at least one of the plurality of valid detections and the calibration track. The method includes computing a heuristic extremum value for a track parameter across all the plurality of calibration tracks and setting a threshold for the track parameter as a function of the extremum value computed, and subsequently comparing subsequent tracks having no associated valid detection of the identifiable object characteristic to the threshold and determining that they correspond to a desired object on the basis of their meeting the threshold.

In accordance with a third broad aspect is provided a system, e.g. to implement the vehicle-tracking method described above. An automatically calibrated vehicle-tracking system may be provided that has an input interface for receiving an image stream from a tracking camera and vehicle license plate data indicative of valid license plate detections from a license plate camera. The vehicle tracking system has a general purpose processor in communication with the input interface and programmable by program code instructions. The vehicle tracking system has a computer-readable memory in communication with and accessible by the general purpose processor and comprising calibration program code for calibrating the vehicle-tracking system. The calibration program code includes a tracking module having instructions for execution by the processor to configure the processor to generate a plurality of calibration tracks each defining the movement of a respective object over the course of several respective images in the image stream received from the tracking camera by, for each calibration track, identifying the respective object in at least a subset of the several respective images and calculating a trajectory across these images. The calibration program code has a pairing module with instructions for execution by the processor to configure the processor to identify, for each of the plurality of calibration tracks, an association between a valid license plate detection and the calibration track by computing a spatio-temporal overlap between a license plate object detected in the valid license plate detection and the calibration track. The calibration program code also has a calibration module with instructions for execution by the processor to configure the processor to compute a heuristic extremum value for a track parameter across all the plurality of calibration tracks and setting a threshold for the track parameter as a function of the extremum value computed, and storing the threshold in the computer-readable memory so the threshold may be retrieved from the computer-readable memory by the general purpose processor when the vehicle-tracking system is running.

The instructions to compute a spatio-temporal overlap between a license plate detected in the valid license plate detection and the calibration track may also involve performing a geometric transformation to derive an image space location in the context image stream of the detected license plate and comparing the image space location of the detected license plate in the context image stream with an image space location of the calibration track.

The instructions to compare the image space location of the detected license plate in the context image stream with an image space location of the calibration track may also involve comparing the image space location of the detected license plate in the context image stream with an image space location of the respective object in at least one context image in the at least a subset of the several respective context images.

The instructions to compute a spatio-temporal overlap between a license plate detected in the valid license plate detection and the calibration track may also involve comparing a detection timestamp associated with the valid license plate detection and a time parameter for the calibration track.

The instructions to identify the respective object in at least a subset of the several respective images may include running a Gaussian average and performing a connected component analysis.

The tracking module may further comprise instructions for execution by the processor to configure the processor to identify the respective object in an image as a body of pixels within a boundary, and to calculate the trajectory of the respective object by computing pixel intersections between bodies of pixels identified in consecutive images of the subset of the several respective context images.

In some embodiments, the track parameter is one of a set of track parameters, and wherein the instructions to compute a heuristic extremum value for a track parameter may include computing a heuristic extremum value for each track parameter of the set of track parameters across all the plurality of calibration tracks. The instructions for setting a threshold for the track parameter as a function of the extremum value computed may involve setting for the each track parameter of the set of track parameters a threshold for the each track parameter as a function of the extremum value computed to generate a set of thresholds.

The set of threshold may include a minimum size of the respective object, a maximum size of the respective object, a minimum appear count of the respective object in the track, a maximum appear count of the respective object in the track, a minimum trajectory distance of the respective object, and/or a maximum trajectory distance of the respective object. The set of threshold parameters may include a minimum size of the respective object, a minimum appear count of the respective object in the track, and a minimum trajectory distance of the respective object.

In some embodiments, the tracking module may have instructions for execution by the processor to configure the processor to discard calibration tracks that fail to meet at least one calibration false-positive threshold corresponding to a given track parameter. The calibration false-positive threshold may be a maximum size of the respective object of the calibration track, a maximum appear count of the respective object whose movement is defined by the calibration track, and/or a maximum trajectory distance of the respective object whose movement is defined by the calibration track.

In some embodiments, the tracking module may include instructions for execution by the processor to configure the processor to, for each of the plurality of calibration track, compare the calibration track to a track criterion and discard the calibration track prior to computing the heuristic extremum value for the track parameter if the track criterion is not met. In some embodiments, the tracking module further may include instructions for execution by the processor to configure the processor to detect a merger between two calibration tracks and discard each of the two calibration tracks prior to computing the heuristic extremum value for the track parameter. In some embodiments, the tracking module may have instructions for execution by the processor to configure the processor to detect a split in a particular calibration track and discard the particular calibration prior to computing the heuristic extremum value for the track parameter.

In some embodiments, the pairing module may have instructions for execution by the processor to configure the processor to discard calibration tracks that have not been successfully associated with a valid license plate detection. In some embodiments, the pairing module may have instructions for execution by the processor to configure the processor to store in the computer-readable memory a preset number of calibration tracks that have not been discarded prior to computing the heuristic extremum value for the track parameter.

BRIEF DESCRIPTION OF THE DRAWINGS

The invention will be better understood by way of the following detailed description of embodiments of the invention with reference to the appended drawings, in which:

FIG. 10 is a block diagram of an exemplary data structure representing a track object.

DETAILED DESCRIPTION

The present application relates to a vehicle tracking system for obtaining information (e.g. an image) on a vehicle that has failed to register a vehicle identifier (e.g. its license plate) detected by the vehicle tracking system. The vehicle tracking system provides additional information on these missed vehicles (herein defined as "context information"), such as an image of the missed vehicle (herein defined as a "context image").

However, even though the tracking architecture and tracking system described herein refers to the application of identifying a vehicle using one of its identifiers (e.g. a license plate), the tracking system is not limited to vehicle tracking and may be used to detect and track other identifying features of other objects in an image, aside from vehicles, in other contexts. For instance, the tracking architecture and tracking system of the present application may also be used for facial recognition, or to detect and obtain information on other biometric features.

Figure 1:
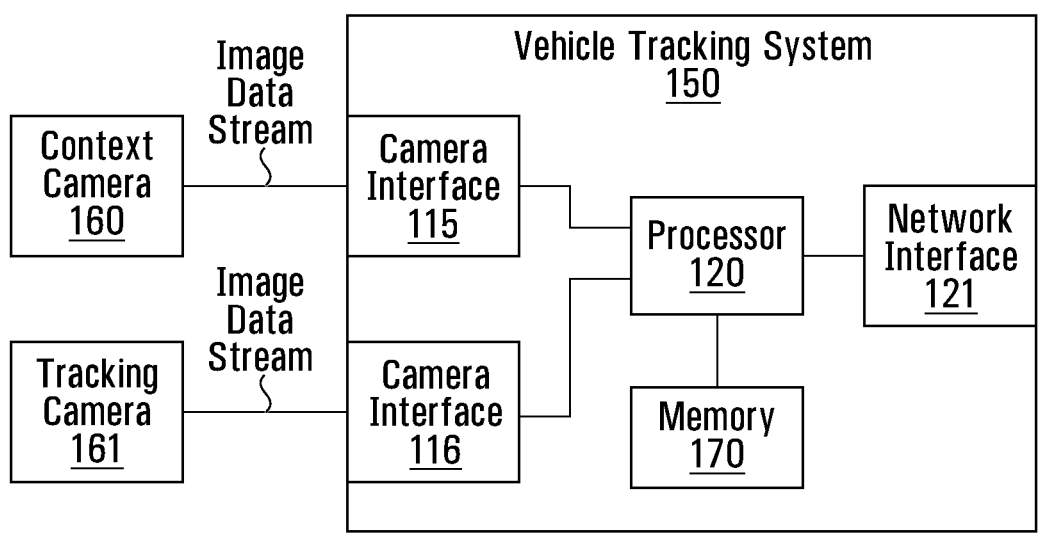
FIG. 1 is a block diagram of an exemplary vehicle tracking architecture with a vehicle tracking system connected with a context camera and a secondary camera.

Reference is now made to FIG. 1, showing an exemplary vehicle tracking system comprising vehicle tracking architecture 100 having a vehicle tracking system 150 connected to a context camera 160 and a secondary camera 161.

The secondary camera 161 is a camera used to acquire information on a vehicle identifier of a vehicle for obtaining a vehicle identification. For instance, the secondary camera 161 may be an infrared camera, producing a monochrome image of, for example, a portion of the vehicle displaying its license plate, for performing a license plate identification. In the present example, the vehicle identifier is a license plate. However, the vehicle identifier may be any other characteristic trait of a vehicle suitable for its identification, such as information on its wheels (e.g. spacing between wheels and traits of the wheel).

Therefore, the secondary camera 161 may have parking data acquisition hardware. The parking data acquisition hardware comprises hardware suitable for acquiring from a nearby parked vehicle, a vehicle identifier. In the present example, the vehicle identifier is a license plate, the license plate ID in this example comprises the unique character (here, numbers and letters) combination of the license plate and may also include a license plate context such as the jurisdiction (e.g. state/province/country) of issuance of the license plate. Accordingly, the parking data acquisition hardware comprises hardware suitable for acquiring a license plate number. In the present example, the vehicle tracking system 100 comprises the AutoVu™ automatic license plate recognition (ALPR) system by Genetec Inc. with SharpX cameras, also by Genetec Inc. which capture both color images with a resolution of 640×480 and monochrome images captured using infrared camera in resolution ranging from 640×480 to 1280×808. In this example, the SharpX camera is suited not only to capture vehicle license plates, but also context images showing the vehicle in its parking spot. Therefore, as the context camera 160 is a camera suitable for producing additional information on a vehicle, the context camera 160 may be a camera producing a coloured image, such as one of SharpX cameras by Genetec Inc., capturing a coloured image with a resolution of 640×480.

In some embodiments, the vehicle tracking architecture may have more than one secondary camera and/or more than one context camera.

The vehicle tracking system 150 has a camera interface 116 connected to the secondary camera 161. The vehicle tracking system 150 has a camera interface 115 connected to the context camera 160. The vehicle tracking system 150 also has a processor 120, connected to the camera interface 115 and camera interface 116. The vehicle tracking system 150 equally has memory 170 connected to the processor 120, and a network interface 121 connected to the processor 120.

The components of the vehicle tracking system 150 (i.e. the camera interface 115, the camera interface 116, the memory 170, the processor 120 and the network interface 121) may have, in one example, a modular architecture, where these components are linked via BUS connections. In another example, these components may be a system-on-a-chip (i.e. S.O.C.). In one example, there may be a first BUS connection between the camera interface 115 and the processor 120, and a second BUS connection between the camera interface 116 and the processor 120. In another example, both camera interface 115 and camera interface 116 may share a common BUS connection with the processor 120.

The Camera interface 115 receives an image data stream from the context camera 160 and transmits the image data stream to the processor 120. In some examples, the image data stream is encoded. In other examples, the image data stream may be analog. The camera interface 115 may also have a decoder function, such as by having its own GPU ("graphics processing unit"), for decoding the encoded stream of image data (encoded streams of image data may be, e.g., MJPEG, MPEG-4, etc.) received from the context camera 160. In other examples, the decoding of the stream of data may be performed by the processor 120 (e.g. the CPU), where the camera interface 115 would not have the hardware for performing a decoding function. For instance, the camera interface 115 may be an uplink port (i.e. WAN port) for receiving the image data stream from the context camera 160, communicating using network protocols.

The camera interface 115 may buffer and serialize the image data stream to provide same to the processor 120. In some examples, there may be optionally a memory buffer connected to the camera interface 115 and the processor 120. The camera interface 115 may then send the stream of image data to the memory buffer, and the processor 120 may retrieve the image data from the memory buffer for processing.

Similarly, the camera interface 116 receives an image data stream from the secondary camera 161 and transmits the image data stream to the processor 120. In some examples, the image data stream is encoded. In other examples, the image data stream may be analog. In some examples, where the secondary camera 161 processes the image data to detect a license plate in an image, using, for example, an automatic number plate recognition software using an optical character recognition algorithm, the data stream sent by the secondary camera 161 may also include, for instance, the license plate detection data (i.e. plate read event) stored along with the image data. In other examples, the license plate detection may be performed by the processor 120 as explained herein.

The camera interface 116 may also have a decoder function, such as by having its own GPU ("graphics processing unit"), for decoding the encoded stream of image data (encoded streams of image data may be, e.g., MJPEG, MPEG-4, etc.) received from the secondary camera 161. In other examples, the decoding of the stream of data may be performed by the processor 120 (e.g. the CPU), where the camera interface 116 would not have the hardware for performing a decoding function. For instance, the camera interface 116 may be an uplink port (i.e. WAN port) for receiving the image data stream from the secondary camera 161, communicating using network protocols.

The camera interface 116 may buffer and serialize the image data stream to provide same to the processor 120. In some examples, there may be optionally a memory buffer connected to the camera interface 116 and the processor 120. The camera interface 116 may then send the stream of image data to the memory buffer, and the processor 120 may retrieve the image data from the memory buffer for processing.

The processor 120 is a general-purpose programmable processor, namely in this example, and Intel Atom™ processor. In this example, the processor 120 is shown as being unitary, but the processor may also be multicore, or distributed (e.g. a multi-processor).

The computer readable memory 170 stores program instructions and data used by the processor 120. The computer readable memory 170, though shown as unitary for simplicity in the present example, may comprise multiple memory modules and/or cashing. In particular, it may comprise several layers of memory such as a hard drive, external drive (e.g. SD card storage) or the like and a faster and smaller RAM module. The RAM module may store data and/or program code currently being, recently being or soon to be processed by the processor 120 as well as cache data and/or program code from a hard drive. A hard drive may store program code and be accessed to retrieve such code for execution by the processor 120, and may be accessed by the processor 120 to store, for instance, track objects, blob objects, calibration data, etc., as explained herein. The memory 170 may have a recycling architecture for storing, for instance, the image data, blob objects and track objects, where older data files are deleted when the memory 170 is full or near being full, or after the older data files have been stored in memory 170 for a certain time.

The vehicle tracking system 150 also has a network interface 121 communicating with the processor 120. The network interface 121 may be an uplink port (i.e. WAN port) or a wireless interface for establishing a wireless connection with, for instance, a remote server. In some examples, the network interface 121 receives data associated with "vehicle detection events" from the processor 120. The "vehicle detection events" may include, for example, a "license plate read" event or, image data or track object data on a vehicle that did not have its vehicle identifier, or license plate, properly identified using the ALPR technology of the vehicle tracking architecture 100. The data associated with "vehicle detection events" may be compressed or uncompressed.

The network interface 121 may send the data associated with "vehicle detection events" to a remote server. In some example, the network interface 121 may have a user interface, such as a screen and peripherals for allowing a user to view and analyze the "vehicle detection events".

Figure 2:
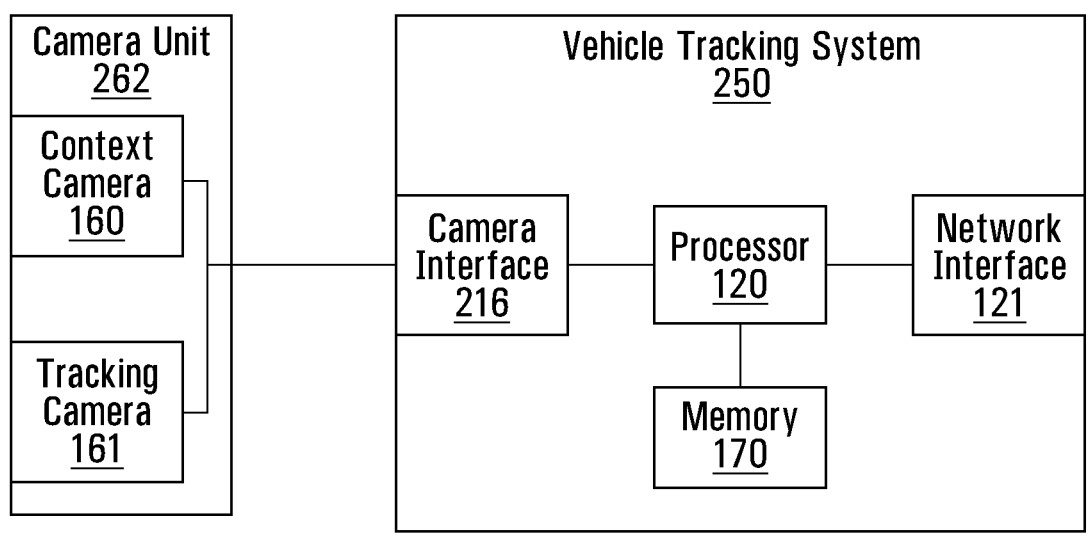
FIG. 2 is a block diagram of another exemplary vehicle tracking architecture with a vehicle tracking system connected with camera system with a context camera and a secondary camera.

As shown in FIG. 2, there may be an exemplary vehicle tracking architecture 200 with a vehicle tracking system 250 having a single camera interface 216 for receiving image data streams via a single connection (e.g. one Ethernet connection) from both the context camera 160 and the secondary camera 161. Context camera 160 and secondary camera 161 may be combined in a single camera unit 262 which provides a single joint output stream (e.g. side-by-side images within a frame) or may provide two output streams over a same physical connection. Each of the image data streams originating respectively from the context camera 160 and the secondary camera 161, for example, may have its own port, each of the image data streams having its own port number.

Figure 3:
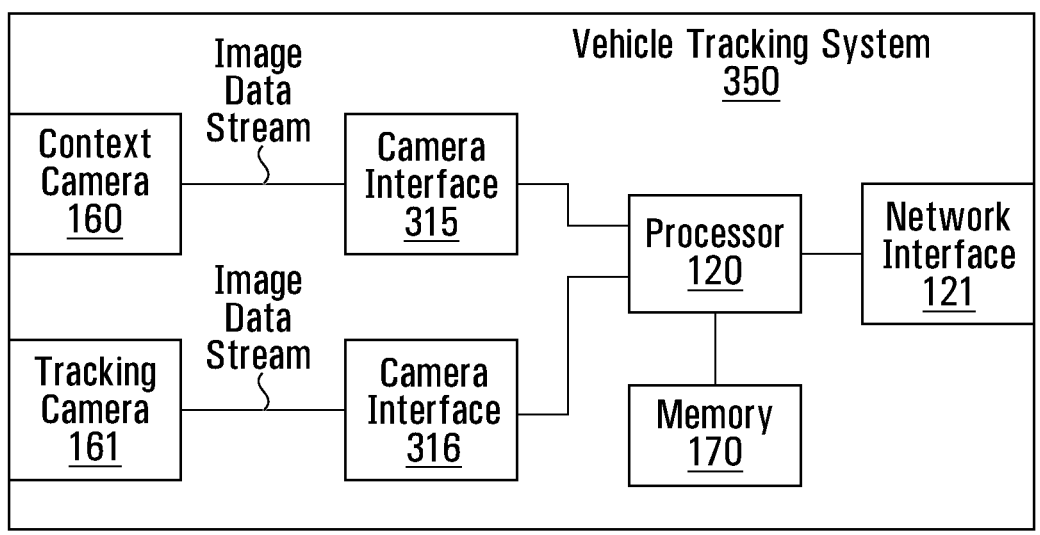
FIG. 3 is a block diagram of an exemplary vehicle tracking architecture having a vehicle tracking system with a context camera and a secondary camera.

As shown in FIG. 3, the context camera 160 and the secondary camera 161 may form part of the vehicle tracking system 350, where the vehicle tracking system 350 includes all of the components of the vehicle tracking architecture 300. In this example, the context camera 160 may have its own camera interface 315 that buffers and serializes the image data received from the context camera 160. The camera interface 315 communicates the image data stream to the processor 120 via, for instance, a BUS connection.

Similarly, the secondary camera 161 may have its own camera interface 316 that buffers and serializes the image data received from the secondary camera 161. The camera interface 316 communicates the image data stream to the processor 120 via for instance, a BUS connection. In some examples where the secondary camera 161 and the context camera 160 are part of the vehicle tracking system 350, the secondary camera 161 and the context camera 160 share a single camera interface, communicating with the processor 120, where each of the image data streams originating from respectively each of the context camera 160 and the secondary camera 161 may have its own port, having each its own port number (not shown).

Figure 4:
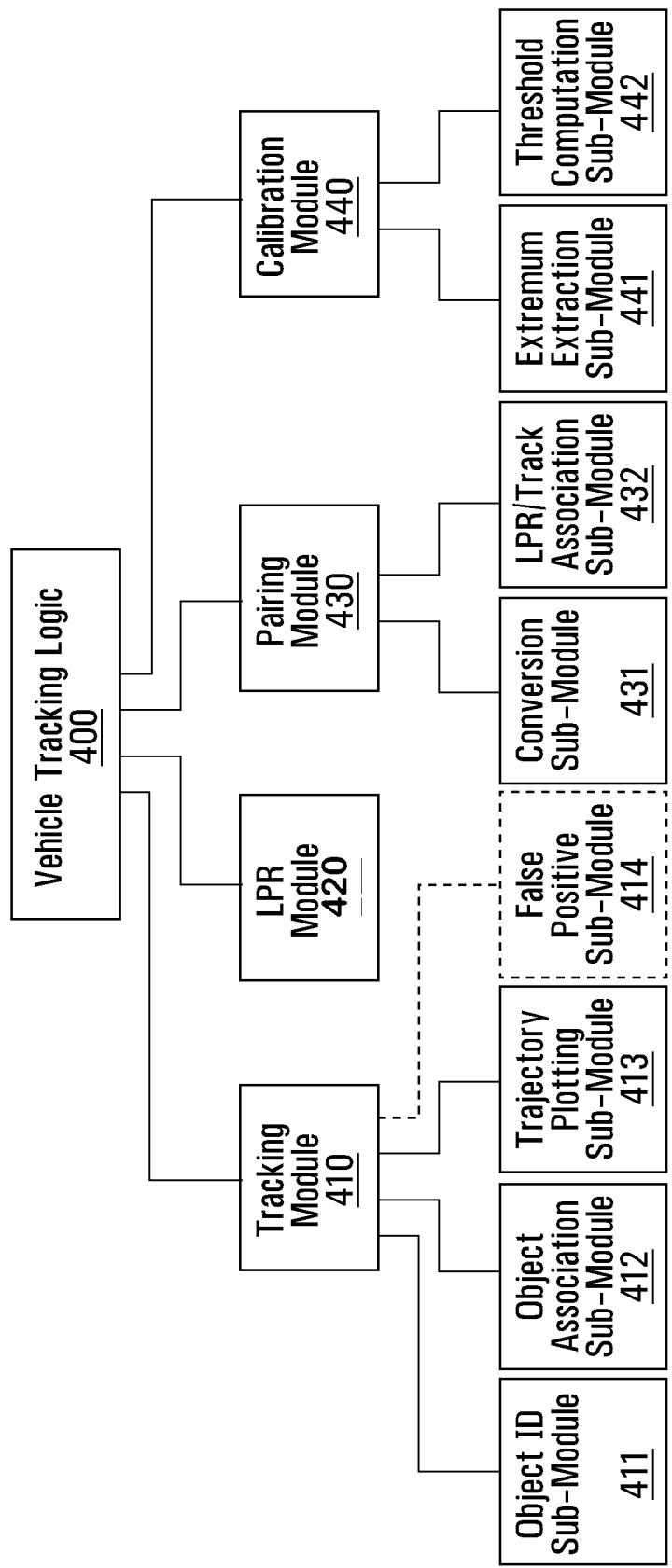
FIG. 4 is a block diagram of an exemplary vehicle tracking logic that is stored in the memory and implemented by the processor of an exemplary vehicle tracking system.

As shown in FIG. 4, the vehicle tracking logic 400 is an exemplary program stored in memory, such as memory 170 of the vehicle tracking systems 150, 250 and/or 350, that can be called and executed by the processor 120 to perform vehicle detection, which includes vehicle tracking and/or license plate detection. More particularly, the vehicle tracking logic 400 contains program code for performing the auto-calibration of an exemplary vehicle tracking system 150, 250 and/or 350.

The vehicle tracking logic 400 identifies blob objects within at least a subset of context images received by the context camera 161 and plots a track of the objects across these context images in which corresponding blob objects have been identified, the track object representing the trajectory of these blob objects across the context images.

The vehicle tracking logic 400 has a tracking module 410 comprising program code to perform tracking of a vehicle to across a series of context images. The tracking module 410 receives a series of context images as input and outputs a track object. When the vehicle tracking system is undergoing auto-calibration, the tracking module 410 produces a calibration track object, a track object that is used for the purposes of calibrating the vehicle tracking system as explained herein.

The tracking module 410 comprises in turn an object identifier submodule 411, an object association submodule 412, a trajectory plotting submodule 413 and, optionally a false positive submodule 414.

The object identifier submodule 411 comprises program code for identifying a blob object within a context image by performing analysis of its image data. As explained herein with respect to FIG. 9, the blob object is a portion of an image's foreground associated with a moving object. Therefore, the program code for identifying the blob object contains a blob identification code including a background subtraction algorithm (e.g. running a running a Gaussian Average-running a Gaussian probabilistic density function) and a blob extraction algorithm (e.g. connected component analysis for grouping foreground pixels). The blob object is then stored in memory 170 by the object identifier submodule 411 once created.

In some embodiments, the object identifier submodule 411 may have program code for performing a false-positive analysis of the blob object which eliminates certain blob objects that fail to meet certain requirements. For instance, a false-positive parameter may be a maximum blob object size. The identified blob object that has a blob size (the blob size being, for example, calculated from the bounding rectangle information stored with the blob object) greater than the maximum blob object size is discarded. In some embodiments, the false-positive analysis of the blob size may occur once the track object is created, as a function of the history of the blob object size data stored as part of the track object as described herein.

The object association submodule 412 has program code directed to associating blob objects identified in different image frames. The image frames may, or may not, be consecutive. The object association submodule 412 may have an algorithm for establishing an image-space location of different blob objects across at least a subset of the context images outputted from the context camera 160, the image-space location performed, by example, by using a correspondence matrix between blob objects identified in different image frames. For instance, the correspondence matrix may calculate the number of intersecting pixels between all possible pairs of blobs identified in each of two respective image frames.

The object association submodule 412 may also perform pattern matching between blob object, such as the pattern matching performed when the vehicle tracking system is in its running state. The pattern matching utilizes corners found in the blob object, related to the texture of the blob object, the corners identified in four areas of the blob object plotted out around the centroid of the blob object. The pattern matching may be used to discard certain track objects that have a pattern matching value inferior to a set threshold value for a pattern matching counter. The pattern matching is performed for ensuring, for instance, that the track objects are in fact those of moving vehicles. An exemplary pattern matching algorithm contained within the object association submodule 412 is that of the Harris Corner detector.

Moreover, the pattern matching may include a patch-based comparison using sub-images ("patches") extracted around a corner (the "center"). More specifically, for specific corners (e.g. for each corner), one or more sub-images around (e.g. centered by) a corner are correlated with corresponding sub-image(s) (e.g. of corresponding corners) in the next blob object to derive a pattern matching value. The pattern matching value may thus be a function (e.g. total or average) of a correlation function for each of the corners used in a blob.

The trajectory plotting submodule 413 is a program code that may be executed by the processor to plot the trajectory of the blob object between different image frames once an association between blob objects is completed by the object association submodule 412. The trajectory is plotted, for instance, by determining the displacement of the centroids of a blob object from a first image frame to a second image frame in which the blob object appears. The centroid may be defined in a blob object as a set of x and y coordinates, a point in two-dimensional space. The trajectory plotting submodule 413 may calculate the vector representing the translation of the centroid in the first image to the second image. The result of trajectory plotting submodule 413 is a track object, such as track object 1000 as illustrated in FIG. 10.

The trajectory plotting module 413 may also have program code for discarding certain track objects as a function of false-positive criteria. A false-positive criterion may be, for example a maximum appear count of a blob object in a track (i.e. the number of image frames in which a blob object of a respective track appears, where the track object contains data on the number of times the track was seen in as described with respect to FIG. 10). If the track object has an appearance count for its blob object that is greater than the maximum appearance count false-positive threshold, then the track object is discarded.

Another example of a false-positive criterion is a maximum distance travelled by the blob object. The track object, as illustrated with respect to FIG. 10, contains data with respect to the trajectory of the track object, calculated from the vectors defining the displacement of the centroid of a blob object between image frames. If the track object has a value for the trajectory distance that is greater than the value set for maximum distance travelled false-positive threshold parameters, then the track object may be discarded.

The trajectory plotting module 413, and/or the object association module 412, may also detect if an old track object is subject to a merge with another track object, or splits into two track objects. For instance, when performing the correspondence matrix using the program code of the object association module 412, if a blob object of the old track object in a first image intersects with two blob objects in a second image frame, and a first portion of the pixels of the blob object in the first image correspond with a portion of pixels of the first blob object in the second image frame, and a second portion of the pixels of the blob object in the first image correspond with the a portion of pixels of the second blob object in the second image frame, then the result may two new track objects resulting from the splitting of the old track object and the discarding of the old track object.

Moreover, in the example of detecting a merger of track objects, there may first be a first old track object with a first track object in a first image frame, and a second old track object with a second track object in the same first image frame. In the second image frame, there is a blob object that is identified, the pixels of the blob object of the second image intersecting with the pixels of the first track object of the first image and the pixels of the second track object in the first image frame by performing the correspondence matrix. Moreover, a first portion of the pixels of the blob object in the second image frame correspond with at least a portion of the pixels of the first blob object in the first image, and a second portion of the pixels of the blob object in the second image frame correspond with at least a portion of the pixels of the second blob object in the second image. The result is a merger of the two old track objects. The track object that is the result of the two merged track object has its parameter "A list of tracks that have merged with this track" to include the track object IDs of the two tracks objects that led to the merging into the merged track object.

During the calibration phase of the vehicle tracking system, a calibration track object may be discarded by the trajectory plotting submodule 413 if a split or a merger is detected with respect to the calibration track.

In some embodiments, the tracking module 410 may optionally have a false-positive module 414 comprising the program code described above with respect to object identifier submodule 411 and track plotting submodule 413 for discarding certain tracks as a function of false-positive criteria.

The vehicle tracking logic 400 has also a license plate recognition module 420 comprising program code for performing the detection of a license plate of a vehicle in an image frame.

The license plate recognition module 420 has program code for performing automatic number plate recognition using optical character recognition on an image to read the vehicle registration plates.

The license plate recognition module 420 receives as input, for example, a monochrome image from the secondary camera 161, the secondary camera 161 being an infrared camera.

The algorithm of the license plate recognition module 420 may include plate localization, plate orientation and sizing, normalization, character segmentation, optical character recognition followed by syntactical and geometrical analysis, and optionally the averaging of the recognized value over multiple fields or images to increase the reliability or confidence of the resulting license plate detection.

Therefore, the license plate recognition module 420 output a "plate read event", including the plate read data such as the characters recognized by carrying out the license plate recognition.

The vehicle tracking logic 400 has also a pairing module 430 comprising program code for pairing a plate read event with a track object. In some examples, the tracking module 410 calls the pairing module 430 to add "plate read event" data to the track object.

The pairing module 430 comprises a conversion submodule 431 and a plate read event/track association submodule 432.

The conversion submodule 431 has program code for undertaking a geometric transformation for converting the coordinates of the image associated with the "plate read event" (where the "plate read event" may be described in 2D space as four ordered 2D points, each point, for example, having its own x and y coordinates) with the coordinates "context image" associated with the track object. For instance, the geometric transformation algorithm may be an affine transformation represented by a transformation matrix. The transformation matrix is determined when performing a stereoscopic calibration procedure of the secondary camera 161 and the context camera 160 using a black panel with white targets, matching the targets in the image of the secondary camera 161 with the image from the context camera 160, providing a set of linear equations. The linear equations are then solved (e.g. Moore-Penrose pseudoinverse) to yield the transformation matrix.

The LPR/track association submodule 432 has program code for performing a spatial-temporal overlap of the image or images associated with the "plate read event" with the coordinates "context image" associated with the track object.

The vehicle tracking logic 400 has also a calibration module 440 comprising program code for determining threshold values as a function of heuristic extremum values calculated from the track parameters of retained calibration tracks for the calibration of the vehicle tracking system.

The calibration module 440 has an extremum extraction submodule 441 and a threshold computation submodule 442.

The extremum extraction submodule 441 has program code that is executed to calculate the amount of valid calibration track objects that are stored in memory 170 for generating the heuristic extremum value. For instance, the algorithm of the extremum extraction submodule 441 may comprise a counter function with an integer that is incremented each time a calibration track object is successfully associated with a "plate read event". For example, the pairing module 430 may call the extremum extraction submodule 441 each time the pairing module 430 successfully pairs a track object with a "plate read event" during calibration, the call prompting the extremum extraction submodule 441 to increase the calibration track number integer by one.

When the calibration track integer equals a desired number of calibration tracks, the extremum extraction submodule 441 may then compute from the calibration track objects stored in memory 170 the heuristic extremum value associated to a designated track parameter. The heuristic extremum value is either a maximum or minimum value of a designated parameter shared by all of the calibration track objects.

The threshold computation submodule 442 has program code that is executed to determine a threshold from the heuristic extremum value calculated by the extremum extraction submodule 441. The threshold value generated by the threshold computation submodule 442 is used to discriminate against certain track objects and blob objects computed by the vehicle tracking system when the vehicle tracking system is in its running stage. The threshold value is stored by the threshold computation submodule 442 in memory 170 and can be accessed by the processor 120 when the vehicle tracking system is in its running state.

The extremum extraction submodule 441 may calculate multiple heuristic extremum values, where each of the calculated extremum values corresponds to a given track object parameter. Similarly, the threshold computation submodule 442 may compute multiple threshold values, each of the computed threshold values corresponding respectively to a given calculated heuristic extremum value.

Figure 9:
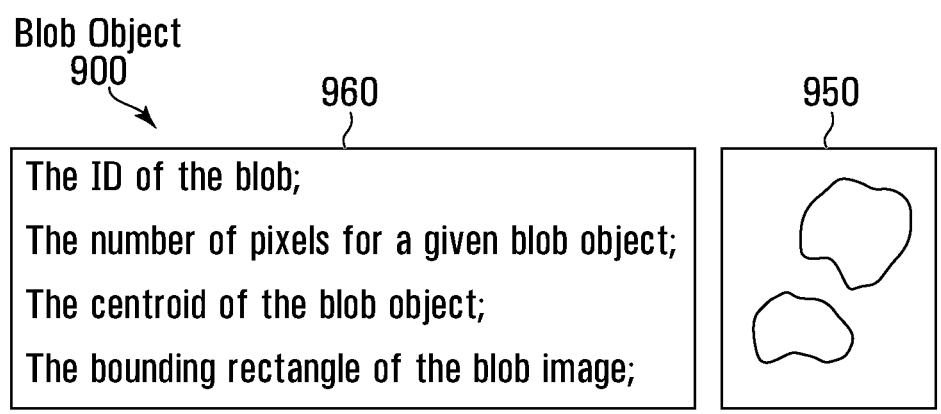
FIG. 9 is a block diagram of an exemplary data structure representing a Blob object.

Reference is made to FIG. 9, showing an exemplary blob object data structure 900 as defined in memory 170.

A blob object is a portion of an image's foreground associated with a moving object. The blob object is created by running blob identification code, including an algorithm for performing background subtraction and then by running a blob extraction algorithm.

Once the blob identification algorithm is completed for a given context image, a second modified context image 950 is created, where each pixel in the second modified context image 950 that is associated with an identified blob object is attributed a given specific ID value, the ID value specific to that given blob object. The image pair (the original context image and its corresponding second modified context image with the blob object ID values) are stored in memory 170.

Each blob object data structure 900 also has a list of information or data 960 on a given blob object including, for example, the ID of the blob object (i.e. the ID used to identify which pixels form part of a specific blob), the number of pixels for a given blob object, the centroid of the blob object defined as a two-dimensional point of the blob image, and the bounding rectangle of the blob object, an expression of the maximum extents of the two-dimensional blob object, defined within its coordinate system (e.g. x(min), x(max), y(min) and y(max)). In some examples, each image pair (context image and its corresponding second modified context image) has its own list of blob objects for that given context image. The list of blob objects is populated by ID and information on the different blob objects identified in that context image. For each blob object, the list of blob objects may have information each respective blob object's ID of the blob object, the number of pixels for a given blob object, the centroid of the blob object defined as a two-dimensional point of the blob image, and the bounding rectangle of the blob image. Therefore, when there is a list of blob objects for a given context image, the blob object data structure 900 includes the portion of that list 960 of blob objects associated with its given blob object.

Reference is made to FIG. 10, illustrating an exemplary track object 1000 as a data object stored in, for example, memory 170. The track object 1000 may be retrieved from memory 170 by the processor 120 for performing vehicle-tracking or auto-calibration, as explained herein.

A track object represents the movement of a blob object across multiple context images and is pieced together by performing an association of blob objects identified in different context images. The track object is therefore also associated with a moving object (e.g. a vehicle) captured by the context camera across multiple frames and is stored to provide additional information on the moving object.

In some examples, the track object 1000 has:
  a. The estimated median image of the track 1000, where the track is created from a series of context images as a function of time—the estimate median image may be the product of an algorithm for retaining the central algorithm of the track object sequence, consisting on keeping the last n/2 images, where n is the number of context image frames in the track object. Exemplary pseudocode for retaining a median image frame of a track object may be:
  Start at the 4$^{th}$ image frame, initialize with alpha=image frame 1, beta=image frame 2, current=image frame 3
  For every new frame in the track object
   if d(0, alpha) is <=d(beta, current)
    alpha becomes beta and beta becomes current
   else
    alpha and beta stay the same
  b. The history of the blob object size, this information obtained, for instance, from the blob object lists 960 contained in the blob object data structure 900 for each blob object that is added as a continuation of the track object 1000;
  c. The state of the track object, which may be, for instance, defined in memory as a string of characters yield the following statuses, read by the vehicle track system: e.g. "new", "fresh", "missing" and "stale", where each of the statues signified:
   i. A new track is a track that is created in the current image frame;
   ii. A fresh track is a track that existed in an previous image frame, but is continued in the current image frame;
   iii. A missing track is a track that is not found in the current frame, but existed in a previous image frame;
   iv. A stale track is a track that is missing in three consecutive image frames;
  d. The time stamp of the image frame in which the blob object of the track appeared for the first time, defined for example when the track object 1000 is created (defined as "new") by referring to the timestamp of the context image in which the track object of the newly created track was identified;
  e. The last context image in which the blob object of the track was identified. This may be obtained by having a field that is updated each time a blob object is added to a track object, where the timestamp of the context image in which the latest blob object is found is added as the first timestamp or replaces the previous timestamp identified in this field;
  f. The last blob object ID associated with the track. This may be obtained by having a field that is updated each time a blob object is added to a track object. The vehicle tracking logic 400 may access the blob object data structure 900 of the latest blob object and retrieve its blob object ID as stored in the blob object list 960. The blob object ID is added to or replaces the current blob object ID contained in the blob last blob object ID field of the track object;
  g. The number of image frames composing the track, i.e. the number of image frames in which the blob object of the track object was seen. This value may be a counter, where each additional context image with a blob object that extends the length of the track object increases the integer of the counter by 1;
  h. The number of consecutive image frames in which the track object is missing, to determine if the state of the track object is to be changed to "stale". This may be a counter, where the counter is increased by 1 for each consecutive context image that does not contain a blob object associated with the track object 1000;
  i. The number of times the pattern matching was successful between blob objects. This may be a counter that is increased by one for each time pattern matching was successful with a blob object identified in the context image and added to the track object;
  j. The trajectory of the track objects between image frames as defined herein;
  k. The patches of the last blob object the track is associated with, the patch saved in memory 170 as smaller sub-image of the context image, the patch having a point representing the center of where it was extracted in the context image;
  l. A flag that is set to true if the track object is associated with a license plate detection event;
  m. A list of track objects that have merged with this track object.

Figure 5:
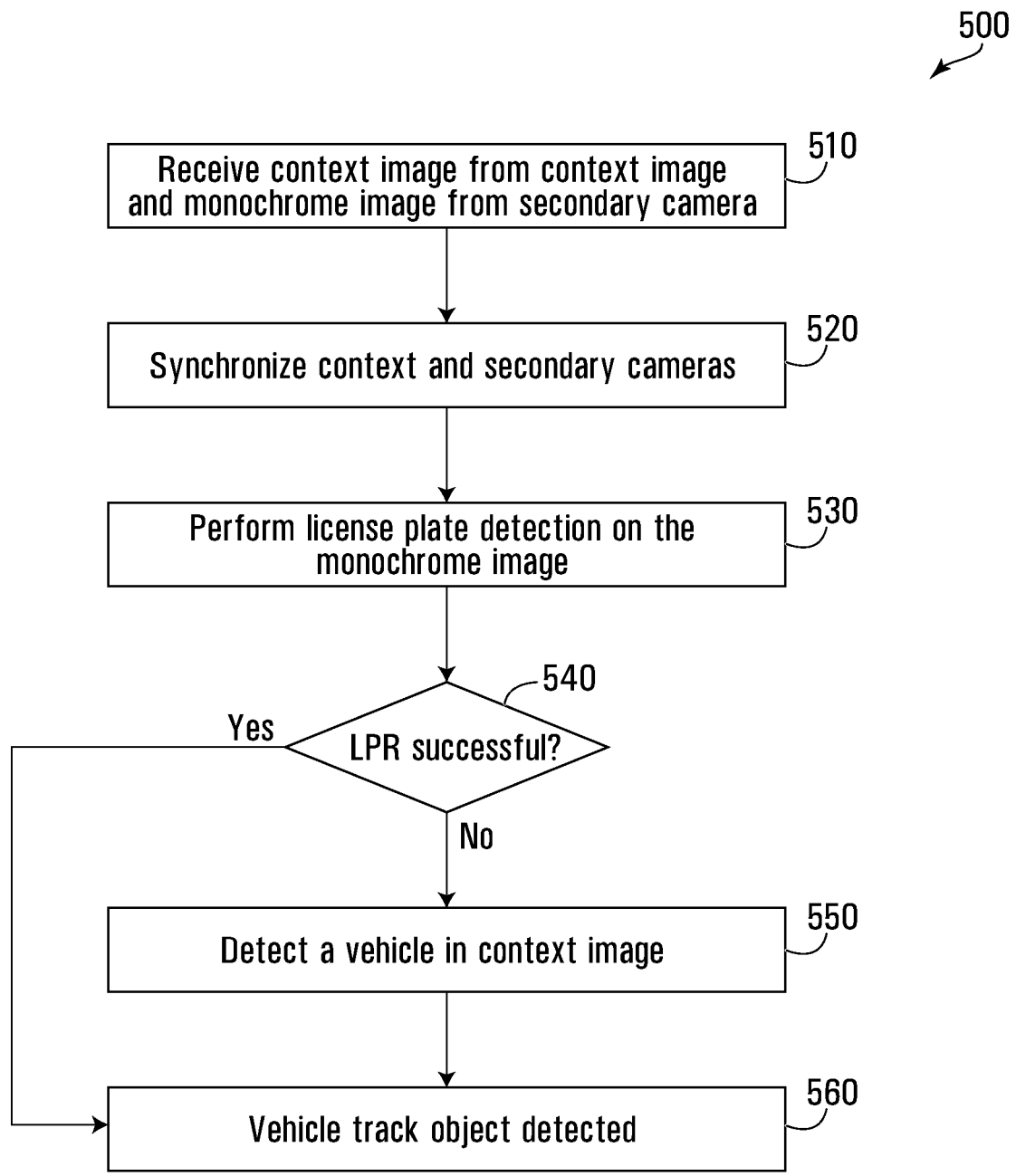
FIG. 5 is a flowchart diagram of an exemplary set of steps carried out by the vehicle tracking program code stored in memory and executed by the processor of an exemplary vehicle tracking system for generating vehicle detection events.

Reference is now made to FIG. 5, illustrating an exemplary method 500 of running an exemplary vehicle tracking system, e.g. using vehicle tracking architecture 100, 200 and/or 300 once calibrated. For the purposes of this example, reference is made to the vehicle tracking architecture 100 but the exemplary method 500 may be employed by any vehicle tracking system in accordance with the present application.

The secondary camera 161 generates, in this example, a monochrome image or multiple monochrome images and the context camera 160 generates context images. The monochrome images and the context images are received by the vehicle tracking system 150 of the vehicle tracking architecture 100 at step 510.

The image feed of the secondary camera 161 and the image feed of the context camera 160 are then synchronized at step 520. Synchronizing the output of the secondary camera 161 and the context camera 160 may be performed using, for example, a time code and a genlock, where a single timing signal is sent over the connections between respectively the context camera 160 and the vehicle tracking system 150, and the secondary camera 161 and the vehicle tracking system 150, and indexing the image frames sent out by the secondary camera 161 and the context camera 160. Alternatively, the images from both cameras may be provided with a timestamp or like label provided by the hardware driver as metadata, and synchronizing the images may involve matching the context image with the closest-timestamped image from the secondary camera.

License plate detection is then performed by executing the program code of the license plate recognition module 420 on one or several of the now synchronized monochrome images at step 530. However, the license plate recognition does not always yield a "plate read event". For instance, when the license plate is masked by an object such as a bike rack, or when the license plate is covered with dirt or snow, the license plate detection may not be successful.

At step 540, the vehicle tracking logic 400 asks itself whether license plate detection was successful or not. In the case where license plate detection is successful, the vehicle tracking logic 400 outputs a "vehicle detected event", the "vehicle detected event" including the "plate read event" as the license plate of the vehicle was successfully read by the license plate recognition module 420. However, if the license plate detection failed to yield a successful "plate read event", then further analysis is required in order to obtain additional information on possible vehicles, so that certain vehicles do not avoid detection.

The vehicle tracking logic 400 is then executed by the processor 120 to perform vehicle detection in the synchronized context images at step 550. The vehicle detection includes identifying and extraction blob objects in context images. The blob objects identified between different context images are then associated in order to generate track objects by using a geometric transformation. Furthermore, the association between blob objects is also performed using a pattern matching algorithm as described herein (e.g. a Harris Corner detector). The pattern matching may be used to discard certain track objects that have a pattern matching value inferior to a set threshold value for a pattern matching counter. The vehicle detection of step 550 may be performed simultaneously with the license plate detection of step 530, where track objects may be later associated with a valid "plate read event", generating "track objects associated with a plate read event" and "track objects not associated with a plate read event".

Once a track object is generated that is not successfully associated with a "license plate read", a median image of the track object, saved in memory 170, may be outputted. The median image corresponds to the median image in the sequence of context images associated to the trajectory of blob objects of the track object. The media image may be the entire context image, or in some examples, only the portion of the median context image associated with the blob object. The median image and the track object contain information on the license plate of the vehicle, for instance, a coloured image of the license plate of the vehicle that was did not have a "plate read event".

The output is a "vehicle detected event" at step 560. The "vehicle detection event" may be either the "plate read event" or the track object information, such as the median image data or track object data, for track objects that were not successfully associated with "plate read events." The "vehicle detected event" may then be sent via the network interface 121 to a remote server or to a user.

Figure 6:
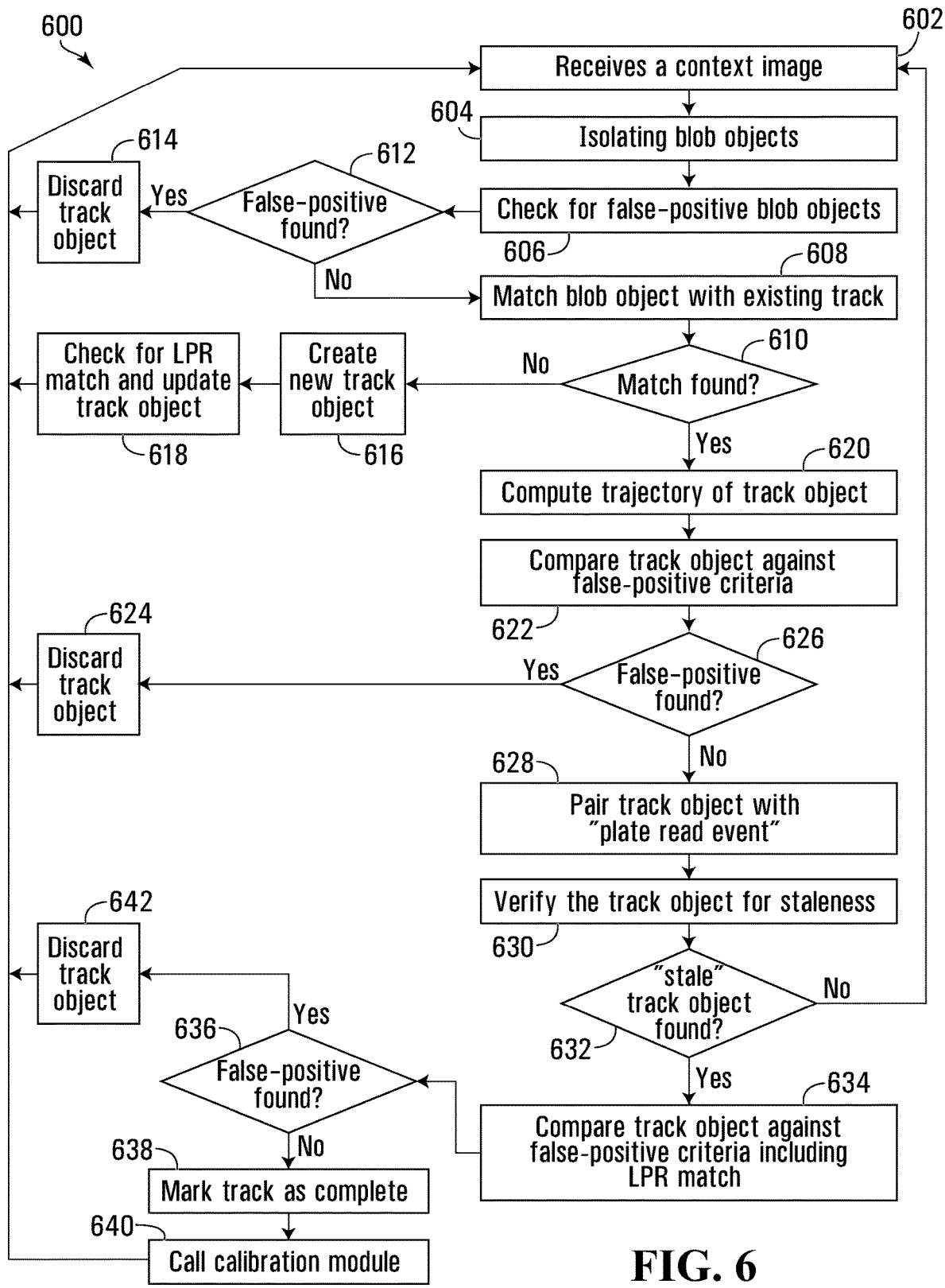
FIG. 6 is a flowchart diagram of an exemplary set of steps carried out by the tracking module and the pairing module of the calibration program code stored in the memory and executed by the processor of the vehicle tracking system.

Reference is now made to FIG. 6, illustrating an exemplary method 600 for performing the tracking and pairing phases of the calibration of the vehicle tracking system 150. Method 600 is, for illustrative purposes, described with respect to the vehicle tracking system 150, but may be performed with respect to any vehicle tracking system as defined in the present application, for example, vehicle tracking system 250 or 350.

The calibration of the vehicle tracking system 150 is performed automatically, without there being any need to have a user perform any manual actions. The calibration method described in FIGS. 6 and 7 require obtaining information on calibration track objects that are undoubtedly associated with a vehicle. These calibration track objects have parameters that serve as a reference for setting threshold values applicable to a certain set of conditions and parameters characteristic or the context camera 160 and secondary camera 161 and their location (e.g relative height, distance from target). Therefore, each of the calibration track objects is to be successfully associated with a "plate read event", signaling that the track objects are in fact those of vehicle (i.e. if there is a "plate read event", then a vehicle has been identified, and not some other moving object). Once these calibration track objects have been identified, calibration may be performed using information distilled from these calibration tracks, namely the threshold values as described herein. When the vehicle tracking system 150 is running, the vehicle tracking system 150 may sift through track objects that have not been associated with a "plate read event" using the threshold parameters, the algorithm of the vehicle tracking logic 400 presuming that a track object meeting the threshold parameters is likely that of a moving vehicle.

Therefore, the calibration of the vehicle tracking system 150 yields certain threshold values that allow to discard certain track objects identified by the vehicle tracking system 150, during its running state, that are not associated with a vehicle (e.g. a bicycle, a dog, a person, or other moving objects that may be found in the context images processed by the vehicle tracking system 150). The threshold values determined during auto-calibration may be:

n. A minimum appear count, corresponding to the minimum number of image frames in which a blob object appears for a given track object;

o. The minimum distance travelled, corresponding to the minimum trajectory, as defined in the track object, that a blob object is to cover across the context images in which the blob object appears;

p. The minimum size of the blob object, corresponding to smallest of the dimensions of the different blob objects that build into the track object.

The above represent but examples of threshold values that may be calculated during the calibration phase of the vehicle tracking system 150. Different threshold values may be used that allow for the discarding of track objects that likely do not correspond a moving vehicle.

The tracking module 410 first receives or retrieves a context image taken by the context camera 160 at step 602. The vehicle tracking logic 400 executed by the processor 120 may provide instructions to retrieve from a memory buffer in which the image data from the camera interface 115 is sent the image data for a first context image.

The object identifier submodule 411 then isolates blob objects by performing a background subtraction algorithm. In some examples, the background subtraction algorithm involves running a Gaussian Average, which involves carrying out a Gaussian probabilistic density function. The object identifier submodule 411 then extracts the blob object through a blob extraction algorithm involving, for example, a connected component analysis for grouping foreground pixels, the foreground pixels associated with the blob object. Each of the blob objects identified by the object identifier submodule 411 may be stored by same in memory 170.

Optionally, the object identifier submodule 411 may also have program code for comparing the identified blob object with false-positive criteria. Such false-positive criteria may be used to discard certain blob objects that have parameters that are most likely not associated with a moving vehicle. For example, a false-positive criterion applied by the object identifier submodule 411 may be a maximum blob size. The identified blob object's blob size may be, for example, calculated from the bounding rectangle information stored with the blob object. The false-positive analysis is then run by the object identifier submodule 411 at step 612. If the blob size of the identified blob object is greater than the maximum blob object size is discarded by the object identifier submodule 411 at step 614. However, if the blob size of the identified blob object is less than the maximum blob size during the false-positive analysis, then the identified blob object is retained. The object identifier submodule 411 then calls upon the object association submodule 412.

The object association submodule 412 has program code for comparing the identified blob object with that of an existing track object at step 608. The comparison is undertaken by using the pixel information stored as data part of each of the respective blob object data structures. For instance, the object association submodule 412 has an algorithm for establishing a correspondence matrix between blob objects identified in different image frames after that the object association submodule 412 retrieves from memory 170 the data on the number of pixels associated with each of the blob objects.

First, the object association submodule 412 may retrieve from memory 170 the blob object ID associated with the last blob object of a given track object within its given track object data. Then, the object association submodule 412 uses the blob object ID to retrieve from memory 170 information on the corresponding blob object. For instance, the object association submodule 412 may retrieve the context image data associated with the given blob object of that ID by analyzing the list of blob objects for that given context image. Once the context image is identified, the corresponding context image with the blob object ID information associated with its pixels is retrieved. Then, the pixel data of the blob object associated with the track object may be obtained by analyzing the pixel ID given to each pixel within the given context image with at least a part of its pixels having blob object ID(s). Similarly, the pixel information on the identified blob object, not at present associated with a track object, may be obtained from the pixel ID information stored with the context image with the blob object ID(s) by comparing with the ID of the newly identified blob object as defined by its blob object data structure. A comparison is then performed between the pixels with the ID of the newly identified blob object with those with the ID of the blob object associated with a track object.

So, once the pixel information for both of the blob objects is obtained, the algorithm of the correspondence matrix is executed to calculate the number of intersecting pixels between all possible pairs of blob objects identified in each of two respective image frames at step 610. If two blob objects intersect (i.e. one identified in each of the respective image frames), as defined by their bounding rectangles, and if pixels from the identified blob object that is not presently associated with a track object match in part with the pixels of the blob object associated with the track object, then the blob object that is not presently associated with a track object is added to the track object.

However, if the blob object that is not presently associated with a track object does not intersect with the blob object associated with the track object, and their pixels do not correspond, then a new track object is created at step 616. Moreover, certain parameters of the track object may also be updated, such as the number of times in which the blob object of track object is missing (in order to determine if the track object's status should be updated as "stale"), if no other blob objects in the context image correspond to the blob object that is associated with the track object, and its track object status (updated to "missing" or, "stale" if the track object as been missing in a certain number of consecutive context image frames).

Moreover, in some examples, if a track object has a status set to "new", and that track object is successfully associated with the newly identified blob object, then the status of that track object is changed from "new" to "fresh".

Once the new track object is created at step 616, the objection association submodule 412 may call upon the pairing module 430 to verify if a "plate read event", as outputted by the license plate recognition module 420, may be paired with the track object at step 618.

The pairing module 430 first retrieves from memory 170 the "plate read event". The conversion submodule 431 then performs a geometric transformation for converting the coordinates of the image associated with the "plate read event" with the coordinates of the context images associated with the track object. For instance, the geometric transformation algorithm may be an affine transformation represented by a transformation matrix. The transformation matrix is determined when performing a stereoscopic calibration procedure of the secondary camera 161 and the context camera 160 using a black panel with white targets, matching the targets in the image of the secondary camera 161 with the image from the context camera 160, providing a set of linear equations. The linear equations are then solved (e.g. Moore-Penrose pseudoinverse) to yield the transformation matrix. The transformation matrix is applied to the context image of the blob object of the new track object (and to the other context images with blob objects that formed the track object), and to the monochrome image(s) from which was determined the "plate read event".

Once the conversion is complete, the conversion submodule 431 calls upon the LPR/track association submodule 432 (herein referred to also as "association submodule 432"). The association submodule performs a temporal-spatial overlap by using the converted coordinates and time stamp of the context image of the blob object of the new track object, and to the monochrome image(s) from which was determined the "plate read event to verify if an association is possible.

For instance, the spatial-temporal overlap may involve associating the track object with the "plate read event" as a function of the time stamp of the image or images from which the "plate read event" was derived, and the time stamp of the context images from which the track object was obtained. For instance, the time stamp of the monochrome image(s) from which the "plate read event" was obtained may be stored as metadata in the "plate read event", retrieved by the LPR/track association submodule 432. Moreover, the time stamp or time information of the track object may be retrieved from memory 170 by the LPR/track association submodule 432 in the track object data, more specifically, for instance, "the time stamp of the image frame in which the blob object of the track appeared for the first time", and the "context image frame in which the blob object of the track object was last identified". The LPR/track association submodule 432 may obtain relative time data for the track object, having information on the creation of the track object (i.e. "the time stamp of the image frame in which the blob object of the track appeared for the first time"), and the most recent addition to the track object (i.e. "context image frame in which the blob object of the track object was last identified").

The LPR/track association submodule 432 may also perform the temporal-spatial overlap by comparing the converted coordinates of the image or images from which the "plate read event" was derived (e.g. stored as metadata with the "plate read event", retrieved by the LPR/track association submodule 432), and the coordinates of the context images from which the track object was obtained, as converted by the conversion submodule 431.

If the new track object is successfully associated with a "plate read event", then the track object data is updated by the association submodule 432, namely setting the flag of the track object to true indicating that the track object has been successfully associated with a "plate read event".

In the case where the newly created blob object was successfully associated with an existing track object at step 610, the object association submodule 412 calls upon the trajectory plotting submodule 413.

The trajectory plotting submodule 413 computes the translation or the change of position of the last blob object associated with the track object with the position of the newly identified blob object at step 620. The trajectory of the track object is then updated to take into account this new translation defined between the previous blob object of the track object and the newly identified and added blob object.

The trajectory plotting submodule 413 retrieves from memory 170 the track object data corresponding to the ID of the last blob object associated with the track object. The trajectory plotting submodule 413 then uses the ID of the last blob object associated with the track object to retrieve the blob object data structure from memory 170, and the centroid information of the blob object associated with the ID of the last blob object associated with the track object and compares it with the centroid information of the newly identified blob object (found in its respective blob object data structure obtained, e.g., by searching for the newly identified blob object's ID) to calculate a vector, the vector replacing the change in position or the translation between the last blob object associated with the track object and compares it with the centroid of the newly identified blob object. The trajectory parameter of the track object stored in memory 170 is then updated, for example, by the trajectory plotting submodule 413 to take into account the new vector in two-dimensions. The trajectory parameter may be a value (e.g. if the trajectory parameter is 54 units before updating, and the vector (x, y) is (−4, 3), then the updated trajectory parameter, taking into account the translation vector, is 59 units, or 54 units+5 units).

Other parameters of the track object may also be further updated by the tracking module 410 (e.g. the last image frame in which the blob object was identified, the last blob object ID associated the track object, etc.).

Optionally, the trajectory plotting submodule 413 may also compare the track object with certain track object false-positive criteria at step 622. Such false-positive criteria may be used to discard certain track objects that have parameters that are most likely not associated with a moving vehicle. For example, a false-positive criterion applied by the object identifier submodule 411 may be a maximum appear count. Each track object may have an appear count indicative of the number of times the blob object to which it is associated has been identified in context images. More specifically, each time the blob object associated with the ID in the track object corresponds with a new blob object identified a new context image, the ID of the blob object parameter stored in the track object is updated with the blob object ID of that new blob object in the new context image, but so is the appear count parameter of the track object increased by one. If the appear count of the track object is, for example, greater than the maximum appear count false-positive criterion, then the track object is discarded at step 624. If the appear count parameter of the track object is less or equal to the maximum appear count false positive criterion, then the track object may be compared with another false positive criterion or passes to step 628.

Another exemplary false positive criterion that may be compared by the trajectory plotting submodule 413 at step 622 is the maximum trajectory of the track object. The trajectory plotting submodule 413 retrieves from memory 170 the corresponding track object data, more specifically the parameter in the track object data of the trajectory of the track object. If the trajectory of the track object is, for instance, greater than the maximum trajectory of the track object false-positive criterion, then the track object is discarded at step 624. However, if the trajectory of the track object is, for instance, less or equal than the maximum trajectory of the track object false-positive criterion, then the track object may be compared with another false positive criterion or passes to step 628.

It will be readily understood that other false-positive criteria may be used by the trajectory plotting submodule 413 than those described herein to discard certain track objects that are likely not associated with a moving vehicle.

The tracking module 410 then calls on the pairing module 430.

The pairing module 430 first verifies if the flag indicative of an association between the track object and a "plate read event" is set to true. If so, the track object has already been associated with a "plate read event".

However, if the flag indicative of an association the track object and a "plate read event" is set to false, then the pairing module 430 may attempt to match the track object with a "plate read event" at step 628.

The pairing module 430 first retrieves from memory 170 the "plate read event". The conversion submodule 431 then performs a geometric transformation for converting the coordinates of the image associated with the "plate read event" with the coordinates of the context image(s) associated with the track object. For instance, the geometric transformation algorithm may be an affine transformation represented by a transformation matrix. The transformation matrix is determined when performing a stereoscopic calibration procedure of the secondary camera 161 and the context camera 160 using a black panel with white targets, matching the targets in the image of the secondary camera 161 with the image from the context camera 160, providing a set of linear equations. The linear equations are then solved (e.g. Moore-Penrose pseudoinverse) to yield the transformation matrix. The transformation matrix is applied to the context image of the blob object of the track object, and to the monochrome image(s) from which was determined the "plate read event".

Once the conversion is complete, the conversion submodule 431 calls upon the LPR/track association submodule 432 (herein referred to also as "association submodule 432") to perform a spatio-temporal overlap between the track object and "plate read events". The association submodule 432 uses the converted coordinates and time stamp of the context images with blob objects associated to the track object, and to the monochrome image(s) from which was determined the "plate read event" to verify if an association is possible.

For instance, the spatial-temporal overlap may involve associating the track object with the "plate read event" as a function of the time stamp of the image or images from which the "plate read event" was derived, and the time stamp of the context images from which the track object was obtained. For instance, the time stamp of the monochrome image(s) from which the "plate read event" was obtained may be stored as metadata in the "plate read event", retrieved by the LPR/track association submodule 432. Moreover, the time stamp or time information of the track object may be retrieved from memory 170 by the LPR/track association submodule 432 in the track object data, more specifically, for instance, "the time stamp of the image frame in which the blob object of the track appeared for the first time", and the "context image frame in which the blob object of the track object was last identified". The LPR/track association submodule 432 may obtain relative time data for the track object, having information on the creation of the track object (i.e. "the time stamp of the image frame in which the blob object of the track appeared for the first time"), and the most recent addition to the track object (i.e. "context image frame in which the blob object of the track object was last identified").

The LPR/track association submodule 432 may also perform the temporal-spatial overlap by comparing the converted coordinates of the image or images from which the "plate read event" was derived (e.g. stored as metadata with the "plate read event", retrieved by the LPR/track association submodule 432), and the coordinates of the context images from which the track object was obtained, as converted by the conversion submodule 431.

If the track object is successfully associated with a "plate read event", then the track object data is updated by, for instance, the association submodule 432, namely setting the flag of the track object to true indicating that the track object has been successfully associated with a "plate read event".

The vehicle tracking logic 400 may periodically verify the track object for staleness at step 630. The vehicle tracking logic 430 may also perform step 630 once the blob objects in a context image have been matched with existing track objects at step 608 or with a new track object at step 616.

The vehicle tracking logic 430 may retrieve from memory 170 the status of the track object found in its track object data to verify if the status has been set to "stale". The track object may be set by the vehicle tracking logic (e.g its object association submodule 412) to "stale" when the track object has been missing from a fixed number of consecutive image frames. The track parameter of the number of consecutive image frames in which the track object is missing may be an integer that is incremented by the object association submodule 412 if the track object is not associated with a new blob object in a new context image at step 608. For example, when the track object is missing from one image frame, the status of that track object is set to "missing". However, if the track object is missing for multiple track objects, as indicated by the integer representing the number of consecutive image frames in which the track is missing, then, e.g., the status of that track object is changed from "missing" to "stale". The vehicle tracking logic 430 may perform the verification for staleness step 630 by identifying track objects with a status set to "stale". For example, the vehicle tracking logic 430 may parse the characters corresponding to the status of the track object to search for "stale". In other examples, the vehicle tracking logic may create and populate a list of track objects (e.g. identified by a track object ID) with a status set to "stale". Each time a track object has its status set to "stale", the vehicle tracking logic 400 may add the track object ID to the list of stale track objects.

The track object is identified as being stale or not being stale at step 632. If the track parameter of the number of consecutive image frames in which the track is missing equals a stale track object integer, then the status of the track object as defined in the track object data is updated from, for instance, "missing" to "stale". However, if track parameter of the number of consecutive image frames in which the track is missing is less than the stale track object integer, then the status of the track object as defined the track object data is left unchanged (e.g. left as "missing"), and method 600 repeats itself.

Optionally, the vehicle tracking logic 400 may compare the stale track object with false/positive criteria at step 634. For instance, a false/positive criterion may be a verification for if the stale track object was subject to a merger or a split. For example, the track object data may have a flag that is set to true if the track object contained merged track objects. The vehicle tracking logic 400 may retrieve from memory 170 the track object data and verify if the flag is set to true if the track object contains any merged track objects, or the vehicle track object 400 may verify in the stale track object data if there are any track object IDs identified in the track object parameter a list of tracks that have merged with this track object. If there are any track object IDs identified in the track object parameter a list of tracks that have merged with this track, or if the flag is set to true if the track object contains any merged track objects, then a false-positive is found at step 636, and the stale track object is discarded at step 642.

Similarly, for example, the track object data may have a flag that is set to true if the track object has split from another track object. If the flag is set to true if the track object has split from another track object, then a false-positive is found at step 636, and the stale track object is discarded at step 642.

Moreover, the vehicle tracking logic 400 verifies the stale track object's flag, stored in the track object data, that is set to true if the track is associated with a "plate read event". If the flag is set to true, and the stale track object is not discarded as failing to meet the false-positive criteria, then the stale track object is marked as complete at step 638. For instance, the status of the track object as found in the track object data may be updated from "stale" to "complete" by the vehicle tracking logic 400. The vehicle tracking logic 400 calls the calibration module 440 at step 640.

Figure 7:
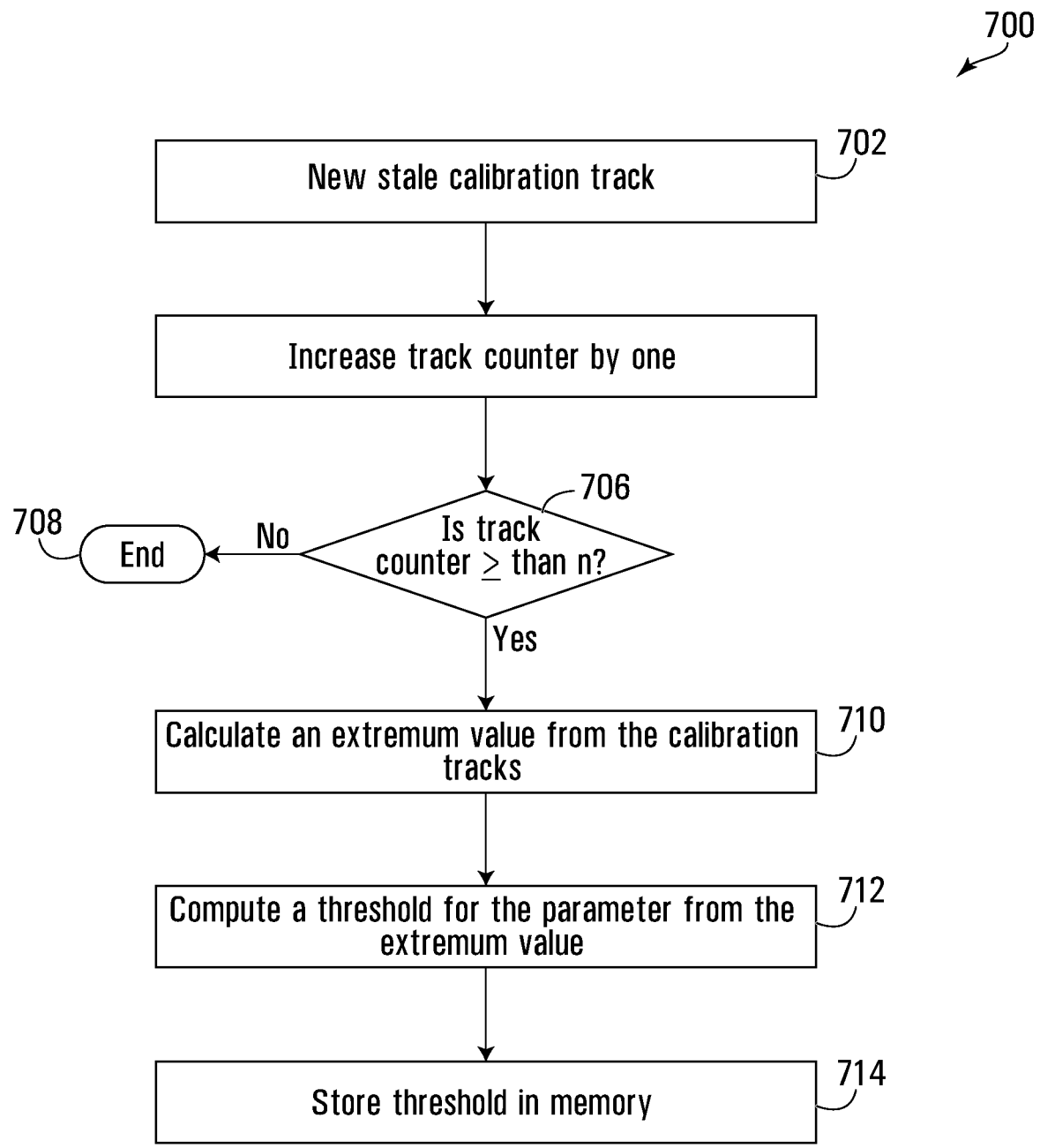
FIG. 7 is a flowchart diagram of an exemplary set of steps carried out by the calibration module of the calibration program code stored in the memory and executed by the processor of the vehicle tracking system.

Reference is made to FIG. 7, illustrating an exemplary method for performing the calibration of the vehicle tracking system 150 once the calibration module 440 has been called by the vehicle tracking logic 400. Method 700 is, for illustrative purposes, described with respect to the vehicle tracking system 150, but may be performed with respect to any vehicle tracking system as defined in the present application, for example, vehicle tracking system 250 or 350.

The calibration module 440 may have a counter indicating the number of calibration tracks that are complete. Once the integer indicating the number of calibration tracks that are complete reaches a certain amount, then the calibration module 440 may perform calibration of the vehicle tracking system 150, having enough tracking object data to calculate threshold parameters for the running state.

In other examples, where the vehicle tracking logic 400 maintains the stale track object list (this list may be updated depending on if the stale track objects meet false positive criteria or are paired with a "plate read event"), the calibration module 440 may verify the number of track object entries in the stale track object list to verify if that number equals or is greater than an integer representing the sought number of completed calibration tracks.

The calibration module 440, or, for example, its extremum extraction submodule 441, retrieves from memory 170 the completed stale track object at step 702. For instance, the calibration module 400 may periodically verify the status of the "track objects" found in memory 170 by parsing the string of characters of status data for a track object for the string of characters "complete". If the parsing leads to a positive result for "complete", then the calibration module 440 may increase the counter for "number of calibration track objects" stored in memory by one.

In other examples, instead of the calibration module 440 retrieving from memory 170 the completed stale track, once the vehicle tracking logic 400 has called the calibration module in step 640, the calibration module 440 is provided with the track object ID of the track object that was updated to "compete" at step 638. In these examples, the calibration module 440 also increases the counter for "number of calibration track objects" stored in memory by one at step 706.

The calibration module 440 then compares the counter for a "number of calibration track objects" with a desired integer, stored in memory 170, of a desired number of completed calibration track objects. The integer of a desired number of completed calibration track objects is an integer for insuring that there are sufficient completed track objects for calibration available in order to perform the computation of desired threshold values during calibration.

If the counter for "number of calibration track objects" is greater or equal to integer of the desired number of completed calibration track objects, then the calibration module calls its extremum extraction submodule 441 which performs step 710. However, if the counter for "number of calibration track objects" is lesser than the integer of the desired number of completed calibration track objects, then the running of the program code for the calibration module 440 ends at step 708, and may be called again by the vehicle tracking logic 400 at step 640 once another stale track object is updated to being "complete".

If the counter for "number of calibration track objects" is greater or equal to integer of the desired number of completed calibration track objects, then the extremum extraction submodule 441, that has been called by its calibration module 440, calculates a heuristic extremum value for a given track object parameters from the completed track objects stored in memory 170 at step 710. The heuristic extremum value may be calculated by retrieving the values for a given track parameter stored in the completed track objects. For instance, the extremum extraction submodule 441 may parse the string of characters of the status value of the different track objects stored in memory 170 for "complete", retrieving the track objects with the status equaling "completed".

The extremum extraction submodule 441 may then retrieve from each of the completed track objects the desired track parameter and identify an extremum value (i.e. corresponding to a maximum or minimum value) from the retrieved values for a given track parameter. For instance, if the extremum extraction submodule 441 is calculating an extremum value to ultimately set the threshold value for a minimum appear count, and if there are five completed track objects stored in memory 170, then the extremum submodule 441 may retrieve the appear count for each completed track object (e.g., respectively for each completed track object, 12002, 10002, 8954, 8966, 14032. In this example, the extremum extraction submodule 441 would then retain the minimum appear count, i.e. 8954.)

It will be understood that the heuristic extremum value extracted by the extremum extraction submodule 441 depends upon the desired threshold value calculated during calibration.

Once the extremum extraction submodule 441 has retrieved the desired extremum value, the extremum extraction submodule 441 then calls on the threshold computation submodule 442.

The threshold computation submodule 442 computes the threshold value from the heuristic extremum value for the given track object parameter at step 712. The threshold computation submodule 442 may perform a simple mathematical operation on the heuristic extremum value to arrive at the threshold value. For example, the heuristic extremum value may be multiplied by a fraction to arrive at the threshold value. For instance, taking the above example of calculating a threshold value for the minimum appear count, the identified heuristic extremum value of 8954 may be, for example, multiplied by 0.6 to arrive at the threshold value of the minimum appear count.

It would be appreciated that any transformation may be performed upon the heuristic extremum value by the threshold computation submodule 442 to arrive at a desired threshold value without departing from the present teachings.

Finally, once the threshold computation submodule 442 has determined the threshold value, the threshold value is then stored in memory by the calibration module 440. The threshold value may be retrieved and implemented by the vehicle tracking logic 400 when the vehicle tracking system 150 is in its running state to discard track objects that do not meet the threshold value.

It would be understood that the steps 710 to 712 of the exemplary method 700 may be repeated in order to establish additional threshold values from the same track object parameters, of different track object parameters retrieved from the track object data of the completed track objects. In some examples, the extremum extraction submodule 441 would retrieve a new heuristic extremum value that would then be used by the threshold computation submodule 442 to compute the additional threshold value, also stored in memory 170.

Once all of the threshold values calculated, the calibration of the vehicle tracking system 150 is complete and the vehicle tracking system 150 may begin to run.

Figure 8:
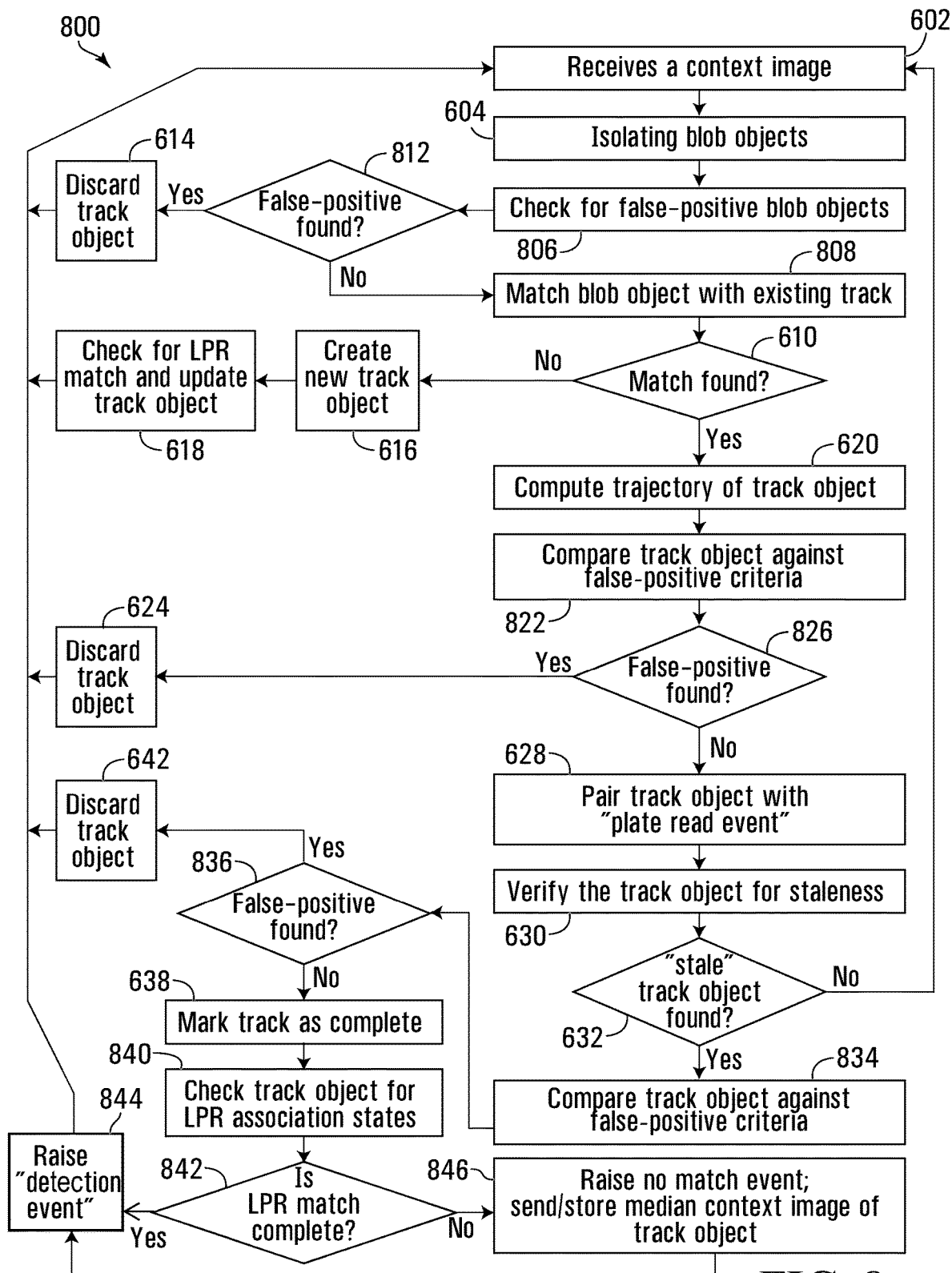
FIG. 8 is a flowchart diagram of an exemplary set of steps carried out by the program code, stored in memory, as executed by the processor for running the vehicle tracking system and obtaining vehicle detection events.

Reference is now made to FIG. 8, illustrating an exemplary method 800 of running an exemplary vehicle tracking architecture 100, 200 and/or 300 once calibrated. For the purposes of this example, reference is made to the vehicle tracking architecture 100 but the exemplary method 500 may be employed by any vehicle tracking system in accordance with the present application.

Method 800 is used by the vehicle tracking system 150 to identify and provide information on moving vehicles that have failed to be identified by a "plate read event". As a result, the output of method 800 is information on a track object, most likely associated with a moving vehicle, provided as, for example, an image associated with the track object. The outputted image may be a median image of the track object, such as the one stored in the track object data of the track object, such as the information contained the track object data structure 1000. If the vehicle tracking system successfully captured the license plate of a moving vehicle, the vehicle tracking system 150 will at least output the "plate read event".

The method 800 also uses the threshold values obtained during calibration of the vehicle tracking system when discarding track objects that are likely not associated with moving vehicles.

In some embodiments, the vehicle tracking system 150 may output both the median output image and the "plate read event" in cases where there was a successful "plate read event" for a specific track object associated with a moving vehicle.

The method 800 undergoes many of the steps of the calibration method 600. For the purposes of the present description, the following differences are detailed.

At step 808 involving the object association submodule 412 association a new blob object with an existing track object, the object association submodule 412 may perform an additional step of pattern matching after applying the correspondence matrix and the matching of the new blob object with an existing track object as described in step 608. The pattern matching involves comparing corners identified in areas of the blob object plotted out around the centroid of the blob object. The pattern matching may be used to discard certain track objects that have a pattern matching value inferior to a set threshold value for a pattern matching counter. For instance, each track object may have its own pattern matching counter stored in the track object data. The object association submodule 412 calculates if the corners identified in the new blob object match the corners of the blob object associated with the last blob object ID of the track object to which it is trying to be associated with. For instance, if at least one corner in one of the areas around the new blob object's centroid match the corner of the blob object associated with the last blob object ID of the track object to which it is trying to be associated with, then the object association submodule 412 increases the pattern matching counter of the track object by one. If not, the pattern matching counter is left at its current integer. Therefore, the pattern matching counter, in some embodiments, corresponds to the number of images frames in which a blob object was matched with the track object that also resulted in successful pattern matching with the track object. An exemplary pattern matching algorithm may be one that of the Harris Corner detector.

The steps 806, 822 and 834 involve, like with steps 606, 622 and 634 of method 600, comparing a track object with at least one false-positive criterion. In addition, steps 806, 822 and 834 may also involve comparing certain blob object parameters and/or track object parameters with threshold values. If the track object and/or blob object fail to meet the threshold parameters when comparing with such at either of steps 812, 826 and 836, following respectively steps 806, 822 and 834, the blob object and/or track object is discarded. However, if the track object and/or blob objet meets the threshold parameters at steps 812, 826 and 836, then the vehicle tracking logic 400 passes respectively to steps 808, 628 and 638.

The threshold values are those determined during the calibration phase (e.g. method 700) of the vehicle tracking system 150, stored in memory 170.

An additional threshold parameter that may be subject to comparison at step 834 by the vehicle tracking logic 400 is the pattern matching false-positive criterion. For instance, the pattern matching false-positive criterion may establish a minimum amount of image frames composing a track object in which pattern matching was successful. For example, pattern matching may be needed to be successful in fifty percent of the image frames composing the track object. In this example, the vehicle tracking logic 400 may retrieve from memory 170 the track object data of the stale track object relating to "the number of image frames composing the track object". The pattern matching false-positive criterion is then set for that specific track object as 0.5 times the integer representing "the number of images frames composing the track object" stored in memory 170. The vehicle tracking logic 400 then compares the pattern matching false-positive criterion with the "pattern matching counter" of the same stale track object, also stored in the track object data of the stale track object. If, for example, the "pattern matching counter" is equal or greater than the pattern matching false-positive criterion of the same stale track object, then the stale track object may be compared to another false-positive criterion, or the stale track object may be marked as complete at step 638. Or lese, the stale track object is discarded.

Once a track object is updated as being complete in method 800 (step 638), then the vehicle tracking logic 400 verifies if the completed track object has been associated with a "plate read event" at step 840. The vehicle tracking logic 400 may retrieve from memory 170 from the completed track object data information on the flag that is set to true if the track object is associated with a "plate read event". The vehicle tracking logic 170 then verifies if the flag is set to true at step 842. If the flag is set to true, then the vehicle tracking logic 400 may raise a "vehicle detection event" for that given completed track object at step 844, the "vehicle tracking logic" retrieving the "plate read event" to be outputted alone or with all or some of the track object data of the completed track object (e.g. the median image of the completed track object).

However, if the flag for the completed track object is not set to true, then the completed track object is not associated with a "plate read event". Therefore, the vehicle tracking system has failed to recognize the license plate for what is most likely a vehicle, having a completed track object associated with the undetected vehicle. The vehicle tracking logic 400 then raises a "no match event" and sends or stores the median image, with or without other track object information as defined in the completed track object at step 846. The vehicle tracking logic 400 may retrieve from memory 170 the estimated median image of the completed track object from its track object data, and output the estimated median image as a "vehicle detection event" at step 844. Therefore, for instances where the vehicle tracking system failed to raise a "plate read event" for a moving vehicle, the vehicle tracking system 150 may still most likely provide information on the moving vehicle for further analysis, by sending, the estimated median image of the moving vehicle, the estimated median image as stored in the track object.

Figure 11:
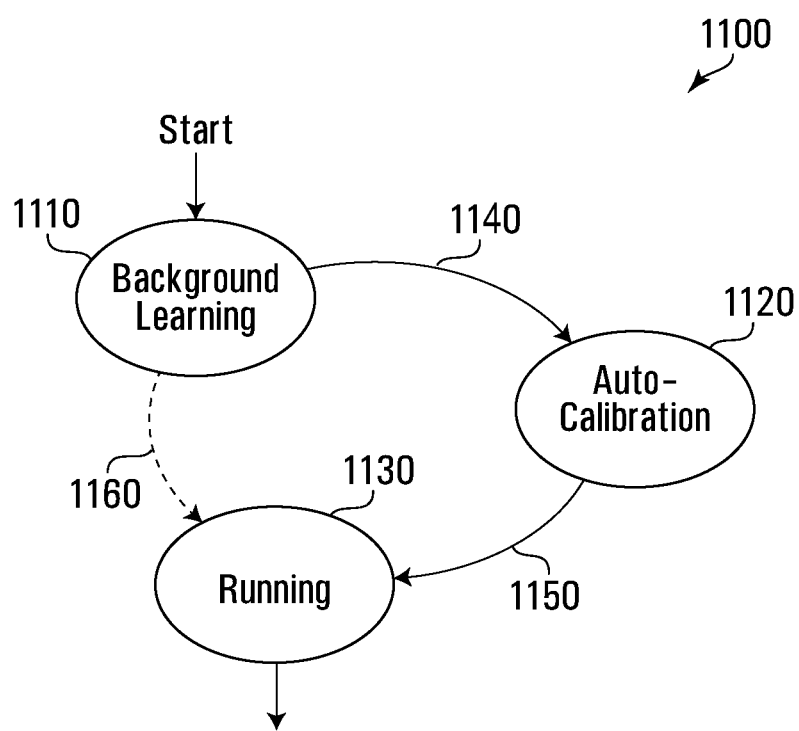
FIG. 11 is a finite state machine of an exemplary change of states of a vehicle tracking system.

Reference is now made to FIG. 11, illustrating an exemplary finite state machine of the vehicle tracking architecture 100. For the purposes of this example, reference is made to the vehicle tracking architecture 100. However, the exemplary method 500 may be employed by any vehicle tracking system in accordance with the present application.

The vehicle tracking system starts at the state of background learning 1110. The background learning state 1110 may involve synchronization of the secondary camera 161 and the context camera 160 as described in FIG. 5, or identifying the background of the image captured by the context camera 160 for the purposes of background subtraction when identifying blob objects.

Once background learning 1110 is complete, the vehicle tracking architecture 100 performs a transition 1140 from the state of background learning 1110 to the state of auto-calibration 1120. Auto-calibration 1120 is performed as described herein, such as explained in methods 600 and 700 by the vehicle tracking logic 400.

Once the vehicle tracking system 150 has been auto-calibrated, the vehicle tracking architecture 100 then performs a transition 1150 from the state of auto-calibration to its running state 1130 as described herein, for instance, in the methods 500 and 800.

It will be appreciated that the auto-calibration features may be saved in memory 170 and restored, such as, for instance, if the vehicle tracking architecture 100 is restarted, without having to undergo the transition 1140 between the background learning phase 1110 and the auto-calibration phase 1120. Therefore, the vehicle tracking architecture 100 may undergo the transition 1160 directly from the background learning state 1110 to the running state 1130 by uploading the auto-calibration features stored in the memory 170 upon restoration of same.

The present description has been provided for purposes of illustration but is not intended to be exhaustive or limited to the disclosed embodiments. Many modifications and variations will be apparent to those of ordinary skill in the art.

What is claimed is:

1. A method for automatically calibrating a vehicle tracking system, the vehicle tracking system being configured for operation with at least a two camera system for receiving at least a context image stream from a tracking camera and vehicle license plate data indicative of valid license plate detections from a license plate camera, the method comprising:
    a. generating a plurality of calibration tracks each defining an image space movement of a respective object over the course of several respective context images in the context image stream received from the tracking camera by, for each calibration track, identifying the respective object in at least a subset of the several respective context images and calculating an image space trajectory of the respective object across said at least a subset of the several respective context images;
    b. for each of the plurality of calibration tracks identifying an association between a valid license plate detection and the calibration track by computing a spatio-temporal overlap between a license plate detected in the valid license plate detection and the calibration track; and
    c. computing a heuristic extremum value for a track parameter across all the plurality of calibration tracks and setting a threshold for the track parameter as a function of the extremum value computed, the threshold being determinative of a track corresponding to a vehicle,
    wherein the threshold is used for tracking vehicles by subsequently comparing subsequent tracks having no associated valid license plate detection against the threshold and determining that they correspond to respective vehicles on the basis of their meeting the threshold.

2. The method of claim 1, wherein computing a spatio-temporal overlap between a license plate detected in the valid license plate detection and the calibration track comprises performing a geometric transformation to derive an image space location in the context image stream of the detected license plate and comparing the image space location of the detected license plate in the context image stream with an image space location of the calibration track.

3. The method of claim 2, wherein the comparing the image space location of the detected license plate in the context image stream with an image space location of the calibration track comprises comparing the image space location of the detected license plate in the context image stream with an image space location of the respective object in at least one context image in the at least a subset of the several respective context images.

4. The method of claim 1, wherein computing a spatio-temporal overlap between a license plate detected in the valid license plate detection and the calibration track comprises comparing a detection timestamp associated with the valid license plate detection and a time parameter for the calibration track.

5. The method of claim 1, wherein the identifying of the respective object in at least a subset of the several respective images is performed by computing a running Gaussian average and performing a connected component analysis.

6. The method of claim 1, wherein the respective object is characterized in an image as a body of pixels within a boundary, and the calculating the trajectory of the respective object comprises computing pixel intersections between bodies of pixels identified in consecutive images of the subset of the several respective context images.

7. The method of claim 1, wherein the track parameter is one of a set of track parameters, and wherein the computing a heuristic extremum value for a track parameter comprises computing a heuristic extremum value for each track parameter of the set of track parameters across all the plurality of calibration tracks, wherein setting a threshold for the track parameter as a function of the extremum value computed comprises setting for the each track parameter of the set of track parameters a threshold for the each track parameter as a function of the extremum value computed to generate a set of thresholds, and wherein subsequently comparing subsequent tracks having no associated valid license plate read to the threshold and determining that they correspond to a vehicle on the basis of their meeting the threshold comprises subsequently comparing subsequent tracks having no associated valid license plate read against each threshold of the set of thresholds and determining that they correspond to a respective vehicle on the basis of their meeting each of the thresholds of the set of thresholds.

8. The method of claim 7, wherein the set of thresholds comprises at least one of:
    a. a minimum size of the respective object;
    b. a maximum size of the respective object;
    c. a minimum appear count of the respective object in the track;
    d. a maximum appear count of the respective object in the track;
    e. a minimum trajectory distance of the respective object; and
    f. a maximum trajectory distance of the respective object.

9. The method of claim 8, where the set of thresholds comprises:
    a. a minimum size of the respective object;
    b. a minimum appear count of the respective object in the track; and
    c. a minimum trajectory distance of the respective object.

10. The method of claim 1, further comprising discarding calibration tracks that fail to meet at least one calibration false-positive threshold corresponding to a given track parameter prior to the step of computing the heuristic extremum value for the track parameter.

11. The method of claim 10, wherein the at least one calibration false-positive threshold comprises at least one of:
    a. a maximum size of the respective object of the calibration track;

b. a maximum appear count of the respective object whose movement is defined by the calibration track; and c. a maximum trajectory distance of the respective object whose movement is defined by the calibration track.

12. The method of claim 1, further comprising for each of the plurality of calibration tracks, comparing the calibration track to a track criterion and discarding the calibration track prior to computing the heuristic extremum value for the track parameter if the track criterion is not met.

13. The method of claim 12, further comprising detecting a merger between two calibration tracks and discarding each of the two calibration tracks prior to computing the heuristic extremum value for the track parameter.

14. The method of claim 12, further comprising detecting a split in a particular calibration track and discarding the particular calibration track prior to computing the heuristic extremum value for the track parameter.

15. The method of claim 12, further comprising discarding calibration tracks that have not been successfully associated with a valid license plate detection.

16. The method of claim 12, further comprising accumulating a preset number of calibration tracks that have not been discarded prior to computing the heuristic extremum value for the track parameter.

17. A method for automatically calibrating an object tracking system, the object tracking system being configured for receiving at least one image stream from a camera and for detecting an identifiable object characteristic in the at least one image stream, the method comprising:
   a. generating a plurality of calibration tracks each defining an image space movement of a respective object over the course of several respective images in the image stream received from the tracking camera by, for each calibration track, identifying the respective object in at least a subset of the several respective images and calculating an image space trajectory of the respective object across said at least a subset of the several respective images;
   b. computing a plurality of valid detections of the identifiable object characteristic in the at least one image stream;
   c. for each of the plurality of calibration tracks computing a spatio-temporal overlap between the identifiable object characteristic of at least one of the plurality of valid detections and the calibration track;
   d. computing a heuristic extremum value for a track parameter across all the plurality of calibration tracks and setting a threshold for the track parameter as a function of the extremum value computed, and subsequently comparing subsequent tracks having no associated valid detection of the identifiable object characteristic to the threshold and determining that they correspond to a desired object on the basis of their meeting the threshold.

18. The method of claim 17, wherein the identifying of the respective object in at least a subset of the several respective images is performed by computing a running Gaussian average and performing a connected component analysis.

19. The method of claim 17, wherein the respective object is characterized in an image as a body of pixels within a boundary, and the calculating the trajectory of the respective object comprises computing pixel intersections between bodies of pixels identified in consecutive images of the subset of the several respective context images.

20. The method of claim 17, further comprising discarding calibration tracks that fail to meet at least one calibration false-positive threshold corresponding to a given track parameter prior to the step of computing the heuristic extremum value for the track parameter.

21. The method of claim 20, wherein the at least one calibration false-positive threshold comprises at least one of:
   a. a maximum size of the respective object of the calibration track;
   b. a maximum appear count of the respective object whose movement is defined by the calibration track; and
   c. a maximum trajectory distance of the respective object whose movement is defined by the calibration track.

22. The method of claim 17, further comprising for each of the plurality of calibration tracks, comparing the calibration track to a track criterion and discarding the calibration track prior to computing the heuristic extremum value for the track parameter if the track criterion is not met.

23. The method of claim 22, further comprising detecting a merger between two calibration tracks and discarding each of the two calibration tracks prior to computing the heuristic extremum value for the track parameter.

24. The method of claim 22, further comprising detecting a split in a particular calibration track and discarding the particular calibration track prior to computing the heuristic extremum value for the track parameter.

25. The method of claim 22, further comprising accumulating a preset number of calibration tracks that have not been discarded prior to computing the heuristic extremum value for the track parameter.

26. An automatically calibrated vehicle-tracking system comprising:
   a. an input interface for receiving an image stream from a tracking camera and vehicle license plate data indicative of valid license plate detections from a license plate camera,
   b. a general purpose processor in communication with the input interface and programmable by program code instructions,
   c. a computer-readable memory in communication with and accessible by the general purpose processor and comprising calibration program code for calibrating the vehicle-tracking system, the calibration program code comprising:
      i. a tracking module comprising instructions for execution by the processor to configure the processor to generate a plurality of calibration tracks each defining an image space movement of a respective object over the course of several respective images in the image stream received from the tracking camera by, for each calibration track, identifying the respective object in at least a subset of the several respective images and calculating an image space trajectory of the respective object across said at least a subset of the several respective images;
      ii. a pairing module comprising instructions for execution by the processor to configure the processor to identify, for each of the plurality of calibration tracks, an association between a valid license plate detection and the calibration track by computing a spatio-temporal overlap between a license plate object detected in the valid license plate detection and the calibration track; and
      iii. a calibration module comprising instructions for execution by the processor to configure the processor to compute a heuristic extremum value for a track parameter across all the plurality of calibration tracks and setting a threshold for the track parameter as a function of the extremum value computed, and storing the threshold in the computer-readable memory so the threshold may be retrieved from the computer-readable memory by the general purpose processor when the vehicle-tracking system is running.

27. The system of claim 26, wherein the instructions of the pairing module to compute a spatio-temporal overlap between a license plate detected in the valid license plate detection and the calibration track comprises performing a geometric transformation to derive an image space location in the context image stream of the detected license plate and comparing the image space location of the detected license plate in the context image stream with an image space location of the calibration track.

28. The system of claim 27, wherein the instructions of the pairing module to compare the image space location of the detected license plate in the context image stream with an image space location of the calibration track comprises comparing the image space location of the detected license plate in the context image stream with an image space location of the respective object in at least one context image in the at least a subset of the several respective context images.

* * * * *